United States Patent
Moriguchi et al.

(10) Patent No.: US 10,895,454 B2
(45) Date of Patent: Jan. 19, 2021

(54) MOVEMENT LINE INFORMATION GENERATION SYSTEM, MOVEMENT LINE INFORMATION GENERATION METHOD AND MOVEMENT LINE INFORMATION GENERATION PROGRAM

(71) Applicant: NEC CORPORATION, Tokyo (JP)

(72) Inventors: Yukie Moriguchi, Tokyo (JP); Yuusuke Konishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/509,715

(22) Filed: Jul. 12, 2019

(65) Prior Publication Data

US 2019/0331484 A1    Oct. 31, 2019

Related U.S. Application Data

(63) Continuation of application No. 14/380,077, filed as application No. PCT/JP2013/000976 on Feb. 21, 2013, now Pat. No. 10,648,803.

(30) Foreign Application Priority Data

Feb. 29, 2012   (JP) ................................ 2012-043641

(51) Int. Cl.
*G01B 21/00* (2006.01)
*G07C 9/00* (2020.01)
(Continued)

(52) U.S. Cl.
CPC ............ *G01B 21/00* (2013.01); *G01S 5/0294* (2013.01); *G06K 9/00335* (2013.01);
(Continued)

(58) Field of Classification Search
CPC .. G01B 21/00; G01S 5/0294; G06K 9/00335; G06K 9/00771; G06Q 10/0833;
(Continued)

(56) References Cited

U.S. PATENT DOCUMENTS 5,940,538 A * 8/1999 Spiegel ................... G06T 7/246
345/473
8,409,024 B2    4/2013 Marty et al.
(Continued)

FOREIGN PATENT DOCUMENTS

JP       2005031955 A    2/2005
JP       2007240295 A    9/2007
(Continued)

OTHER PUBLICATIONS

Maxime Gariel "Trajectory Clustering and an Application to Airspace Monitoring" (Year: 2011).*
(Continued)

*Primary Examiner* — Regis J Betsch
*Assistant Examiner* — Kaleria Knox
(74) *Attorney, Agent, or Firm* — Sughrue Mion, PLLC

(57) ABSTRACT

At least one processor inputs trajectories of moving bodies in a tracking region. The at least one processor generates a score corresponding to each of the identification information, the score indicating a likelihood that the moving bodies corresponding to the identification information present in the area. The at least one processor determines an area with a high density of the moving bodies that a density of the moving bodies is a predetermined value or higher. The at least one processor associate, based on the score, a set of moving bodies and a set of identification information of the moving bodies. The at least one processor controls a display to display, for the area with the high density of the moving bodies, the set of moving bodies and the set of identification information in association with the score.

15 Claims, 20 Drawing Sheets

(51) Int. Cl.
*G01S 5/02* (2010.01)
*G06K 9/00* (2006.01)
*G06Q 10/08* (2012.01)
*G06T 7/246* (2017.01)
*G06Q 30/02* (2012.01)
*G07C 9/28* (2020.01)

(52) U.S. Cl.
CPC ......... *G06Q 10/0833* (2013.01); *G06T 7/246* (2017.01); *G07C 9/00* (2013.01); *G06Q 30/02* (2013.01); *G06T 2207/30241* (2013.01); *G07C 9/28* (2020.01)

(58) Field of Classification Search
CPC ...... G06Q 30/02; G07C 9/00; G07C 9/00111; G06T 2207/30241; G06T 7/246; G06T 4/246; H04N 7/18; G09G 5/003
See application file for complete search history.

(56) References Cited

U.S. PATENT DOCUMENTS

| | | |
|---|---|---|
| 2002/0087266 A1 | 7/2002 | Sugimoto et al. |
| 2002/0111834 A1 | 8/2002 | Kogure |
| 2005/0206581 A1* | 9/2005 | Kondo ............... G09G 5/003 345/1.2 |
| 2008/0130951 A1* | 6/2008 | Wren ............... H04N 7/18 382/103 |
| 2009/0195401 A1 | 8/2009 | Maroney |
| 2010/0207762 A1* | 8/2010 | Lee ............... G06K 9/00771 340/541 |
| 2011/0029278 A1 | 2/2011 | Tanigawa |
| 2012/0044265 A1 | 2/2012 | Khorashadi et al. |
| 2012/0263437 A1* | 10/2012 | Barcons-Palau ............ G06K 9/00335 386/241 |

FOREIGN PATENT DOCUMENTS

| | | |
|---|---|---|
| JP | 2008122093 A1 | 5/2008 |
| WO | 2010095437 A1 | 8/2010 |
| WO | 2011021588 A1 | 2/2011 |

OTHER PUBLICATIONS

Yukie Moriguchi et al., "A Robust and Fast Human Trajectory Detection Method based on Sensor Fusion," IEICE Technical Report, Feb. 28, 2011 (Feb. 28, 2011), vol. 110, No. 454, pp. 7-14, ISN 0913-5685.

Communication dated Mar. 9, 2020 from the United States Patent and Trademark Office in U.S. Appl. No. 16/509,732.

An Office Action dated Jun. 23, 2020, which issued during the prosecution of U.S. Appl. No. 16/509,732.

* cited by examiner

| TIME | DETECTION POSITION | DETECTED ID |
|---|---|---|
| t1 | AREA 12 | ID 1 |
| t2 | AREA 12 | ID 1 |
| t3 | AREA 12 | ID 1 |
| t9 | AREA 58 | ID 1, ID 2 |
| t10 | AREA 58 | ID 1, ID 2 |
| t11 | AREA 58 | ID 1, ID 2 |

# MOVEMENT LINE INFORMATION GENERATION SYSTEM, MOVEMENT LINE INFORMATION GENERATION METHOD AND MOVEMENT LINE INFORMATION GENERATION PROGRAM

This application is a Continuation Application of U.S. application Ser. No. 14/380,077 filed Aug. 21, 2014, which is a National Stage of International Application No. PCT/JP2013/000976 filed Feb. 21, 2013, claiming priority from Japanese Application No. 2012-043641 filed Feb. 29, 2012, the contents of each of which is incorporated herein by reference in its entirety.

TECHNICAL FIELD

The present invention relates to a movement line information generation system for generating movement line information including identification information on a moving body and a trajectory of the moving body detected by different sensors, a movement line information generation method and a movement line information generation program.

BACKGROUND ART

Generally, a movement line of a moving body such as person or object is detected by associating a position of the moving body with identification information on the moving body. Various techniques for movement line detection are proposed (see PLTs 1 and 2, for example).

For example, a multipurpose tracking device described in PLT 1 is connected to a radar device for outputting position information on an object to be tracked (elevation, azimuth and distance) and a target identification sensor device for outputting identification information and a position (elevation and azimuth) of the object to be tracked. The multipurpose tracking device described in PLT 1 links the position information output by the radar device thereby to generate a group of hypotheses including a wake of the target. The multipurpose tracking device generates an angle wake indicating an orientation in which the target is moving by use of the information output by the target identification sensor device. Further, the multipurpose tracking device sorts out the hypotheses included in the group of hypotheses by calculating a similarity between each hypothesis and each angle wake. The multipurpose tracking device also reduces the group of hypotheses by deleting less reliable hypotheses and integrating similar hypotheses.

A system described in PLT 2 defines trajectory candidates which are assumed to express a trajectory of an individual moving body, and generates hypotheses based on a pair of trajectory candidate and identification information of the moving body. The system calculates a likelihood at which identification information is detected for each trajectory candidate included in an individual hypothesis, and estimates a maximum-likelihood hypothesis based on the likelihood. The trajectory candidate is generated based on segments of the detected trajectory.

CITATION LIST

Patent Literature

PLT 1: JP 2008-122093 A
PLT 2: WO2011/021588 A

SUMMARY OF INVENTION

Technical Problem

The following problems occur in the method for confirming an association result between a trajectory and identification information on a moving body by generating a plurality of hypotheses (hypotheses of association between trajectory and identification information) combining a group of trajectory candidates of the moving body and the identification information on the moving body and selecting one maximum-likelihood hypothesis.

That is, there is a problem that a true hypothesis cannot be generated. For example, when the number or density of moving bodies increases, the number of trajectory candidates generated based on segments of the trajectory or the number of combinations between a trajectory candidate and identification information on the moving body increases, and consequently calculation cost increases. In order to restrict the increase in calculation cost, a pruning processing is assumed to be performed on the hypotheses and the like. In this case, a hypothesis indicating a true state can be discarded by the pruning processing.

For example, when a position of a person is detected by use of a camera or the like, an object other than the person can be erroneously detected due to a variation in illumination in a tracking region or a movement of the object other than the person to be tracked. An object to be tracked, which is hidden behind an obstacle, cannot be detected. When identification information on a person is detected by use of a RFID (Radio Frequency IDentification) tag or the like, identification information on each person may be erroneously detected or cannot be detected due to how each person holds the RFID tag, the presence of an obstacle arranged in the tracking region or a material of the obstacle. Even if hypotheses are generated based on the data detected under such circumstances, a hypothesis indicating a true association between a trajectory of a moving body and identification information on the moving body may not be generated.

As described above, if a hypothesis indicating a true state is discarded by the pruning processing or a hypothesis indicating a true state is not generated, even if a maximum-likelihood hypothesis is specified, the hypothesis does not indicate a true state and thus hypothesis indicating a true state cannot be acquired.

When many moving bodies are present in a specific area in a tracking region, a plurality of items of identification information have to be associated with a plurality of trajectories. Similar likelihoods may be acquired for a plurality of combinations between a trajectory in the area and identification information. Therefore, even if a maximum-likelihood hypothesis is specified, the hypothesis is ambiguous for a true association between a trajectory of the moving body and identification information on the moving body. If a maximum-likelihood hypothesis is defined as a solution, it is not possible to evaluate how much a trajectory of a moving body and identification information on the moving body are ambiguous (in other words, how much they are reliable).

It is an object of the present invention to provide a movement line information generation system capable of estimating an association between a trajectory of a moving body and identification information on the moving body and quantifying how much the association is ambiguous even if an accurate association between the trajectory of the moving body and the identification information on the moving body cannot be specified, a movement line information generation method and a movement line information generation program.

Solution to Problem

A movement line information generation system according to the present invention is characterized by including a trajectory link candidate generation means for generating trajectory links which are a set of trajectory information capable of being assumed to indicate a trajectory of one moving body, and a trajectory link candidate which is a set of trajectory links including all of trajectory information without omission and overlap by use of trajectory information which indicates a trajectory of a moving body or a segment of a trajectory of a moving body due to interrupted tracking and which includes trajectory identification information for identifying trajectory information and a list of position information and detection times of the position information of a moving body detected while the moving body is being tracked, a likelihood calculation means for, per trajectory link/identification information pair which is a combination of trajectory link and moving body identification information detected in a tracking region, calculating a likelihood concerning the trajectory link indicates the trajectory of the moving body which is identified by the moving body identification information, an identification information association means for associating an individual trajectory link included in a trajectory link candidate with likely moving body identification information per trajectory link candidate based on the likelihood calculated per trajectory link/identification information pair, an association trend quantification means for quantifying a trend of the number of times when trajectory information is associated with moving body identification information per individual moving body identification information for individual trajectory information based on an association result between each trajectory link included in an individual trajectory link candidate and moving body identification information, and an association score calculation means for calculating an association score indicating how much an association between a trajectory indicated by trajectory information and a trajectory of a moving body identified by moving body identification information is ambiguous for each item of moving body identification information per trajectory information based on a value indicating a trend of the number of times when the trajectory information is associated with the moving body identification information.

A movement line information generation method according to the present invention is characterized by including the steps of generating trajectory links which are a set of trajectory information capable of being assumed to indicate a trajectory of one moving body, and a trajectory link candidate which is a set of trajectory links including all of trajectory information without omission and overlap by use of trajectory information which indicates a trajectory of a moving body or a segment of a trajectory of a moving body due to interrupted tracking and which includes trajectory identification information for identifying trajectory information and a list of position information and detection times of the position information of a moving body detected while the moving body is being tracked, per trajectory link/ identification information pair which is a combination of trajectory link and moving body identification information detected in a tracking region, calculating a likelihood concerning the trajectory link indicates the trajectory of the moving body which is identified by the moving body identification information, associating an individual trajectory link included in a trajectory link candidate with likely moving body identification information per trajectory link candidate based on the likelihood calculated per trajectory link/identification information pair, quantifying a trend of the number of times when trajectory information is associated with moving body identification information per Individual moving body identification information for individual trajectory information based on an association result between each trajectory link included in an individual trajectory link candidate and moving body identification information, and calculating an association score indicating how much an association between a trajectory indicated by trajectory information and a trajectory of a moving body identified by moving body identification information is ambiguous for each item of moving body identification information per trajectory information based on a value indicating a trend of the number of times when the trajectory information is associated with the moving body identification information.

A movement line information generation program according to the present invention is characterized by causing a computer to perform a trajectory link candidate generation processing of generating trajectory links which are a set of trajectory information capable of being assumed to indicate a trajectory of one moving body, and a trajectory link candidate which is a set of trajectory links including all of trajectory information without omission and overlap by use of trajectory information which indicates a trajectory of a moving body or a segment of a trajectory of a moving body due to interrupted tracking and which includes trajectory identification information for identifying trajectory information and a list of position information and detection times of the position information of a moving body detected while the moving body is being tracked, a likelihood calculation processing of, per trajectory link/identification information pair which is a combination of trajectory link and moving body identification information detected in a tracking region, calculating a likelihood concerning the trajectory link indicates the trajectory of the moving body which is identified by the moving body identification information, an identification information association processing of associating an individual trajectory link included in a trajectory link candidate with likely moving body identification information per trajectory link candidate based on the likelihood calculated per trajectory link/identification information pair, an association trend quantification processing of quantifying a trend of the number of times when trajectory information is associated with moving body identification information per individual moving body identification information for individual trajectory information based on an association result between each trajectory link included in an individual trajectory link candidate and moving body identification information, an association score and calculation processing of calculating an association score indicating how mach an association between a trajectory indicated by trajectory information and a trajectory of a moving body identified by moving body identification information is ambiguous for each item of moving body identification information per trajectory information based on a value indicating a trend of the number of times when the trajectory information is associated with the moving body identification information.

Advantageous Effects of Invention

According to the present invention, even if an accurate association between a trajectory of a moving body and identification information on the moving body cannot be specified, it is possible to estimate an association between the trajectory of the moving body and the identification information on the moving body and to quantify how much the association is ambiguous.

BRIEF DESCRIPTION OF DRAWINGS

FIG. 13 it depicts a schematic diagram of an ID output probability map corresponding to an ID information input unit 2a.

DESCRIPTION OF EMBODIMENTS

An exemplary embodiment according to the present invention will be described below with reference to the drawings. Identification information will be denoted as ID in the following description.

Figure 1:
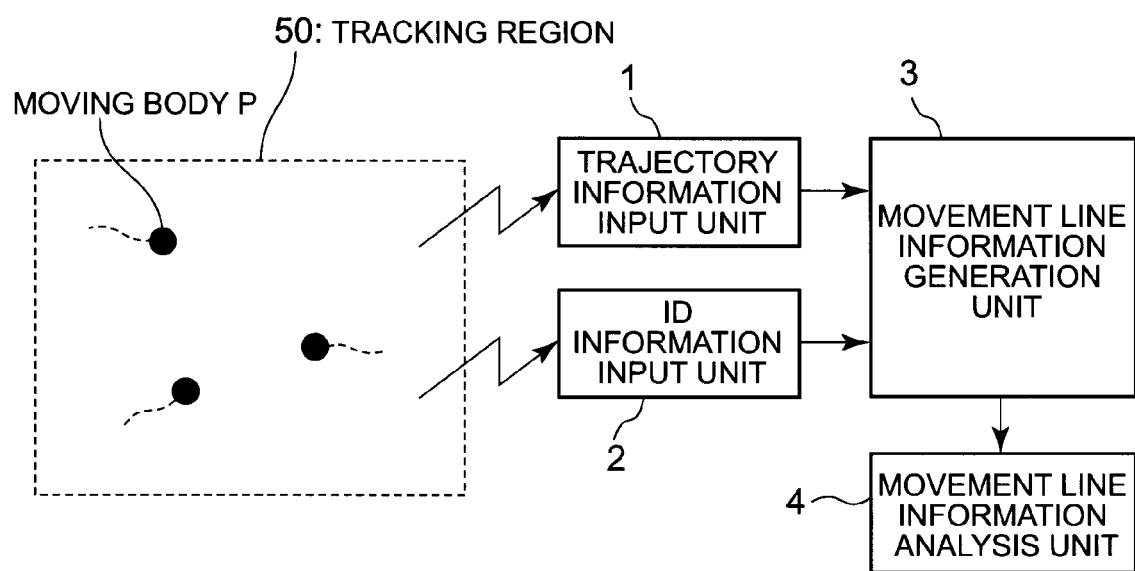
FIG. 1 It depicts a block diagram illustrating an exemplary movement line information generation system according to the present invention.

FIG. 1 is a block diagram illustrating an exemplary movement line information generation system according to the present invention. The movement line information generation system according to the present invention includes a trajectory information input unit 1, an ID information input unit 2, a movement line information generation unit 3, and a movement line information analysis unit 4.

The movement line information generation system generates movement line information which includes a score indicating how much an association between a trajectory of a moving body moving in a predefined tracking region 50 and ID (identification information) on the moving body is ambiguous per ID and which includes position coordinates of the moving body on the trajectory and their detection time information. The score indicates how much an association between a trajectory and a trajectory of a moving body identified by ID is ambiguous. In other words, the score can indicate how much an association between a trajectory and ID is reliable. That is, as the score is higher, ambiguity is less and reliability is higher. The score will be denoted as ID association score below.

Each moving body P may be outside the tracking region 50. A type of the moving body P is not particularly limited, and may be a person, an animal or an object.

The trajectory information input unit 1 is a device for detecting a position coordinate of a moving body in the tracking region 50 and inputting a position coordinate and its detection time in the movement line information generation unit 3. The following description will be made assuming that a 2D coordinate is detected as a position. The trajectory information input unit 1 assigns the same trajectory number to each pair of detected position coordinate and detection time while it can keep continuously tracking one moving body. When tracking a moving body is interrupted and tracking the moving body is restarted, the trajectory information input unit 1 defines a new tracking number which does not overlap with any previously-assigned tracking number, and assigns the new tracking number to a pair of position coordinate and detection time detected for the moving body after the tracking is restarted. The trajectory information input unit 1 inputs a pair of position coordinate and detection time detected for the moving body, and a trajectory number assigned to the pair into the movement line information generation unit 3.

A set of pairs of position coordinate and detection time assigned with a common trajectory number, and the trajectory number are denoted as trajectory information together. The trajectory information can be expressed as (trajectory number 1, (time $t_1$, x coordinate, y coordinate), (time $t_2$, x coordinate, y coordinate), . . . , (time $t_n$, x coordinate, y coordinate)) or the like, for example.

Trajectory information can be discriminated by a trajectory number, and trajectory information capable of being specified by one trajectory number is counted as one item of trajectory information. When tracking one moving body is interrupted and tracking is restarted, a plurality of items of trajectory information with different trajectory numbers are acquired. An individual item of trajectory information can express an individual segment of a trajectory. If tracking one moving body is not interrupted, one item of trajectory information is acquired. Therefore, trajectory information may express a segmented trajectory due to interrupted tracking or an entire trajectory of one moving body.

The trajectory information input unit 1 may detect attribute information on a moving body and may input the attribute information together with a position coordinate, a detection time and a trajectory number into the movement line information generation unit 3. The types of the attribute information may be color, size, shape, weight and the like of a moving body, and when a moving body is a person, may be age, sex, preference and the like, for example. The types of the attribute information are exemplary and are not limited thereto. In this case, the trajectory information includes attribute information at each detection time.

The trajectory information input unit 1 may be a device capable of detecting position information on a moving body in the tracking region 50, specifying its detection time and assigning a trajectory number, and does not need to detect unique ID for each moving body. The trajectory information input unit 1 may be realized by a moving body tracking system using camera, floor pressure sensor, laser range finder, human-sensitivity sensor or radar. When the trajectory information input unit 1 is realized in such a form, a moving body does not need to hold a piece of equipment in order for himself/herself to be detected. The trajectory information input unit 1 may detect a position coordinate of a moving body in a manner that a piece of equipment necessary for detecting a coordinate is held on the moving body. For example, the trajectory information input unit 1 may be realized by a moving body tracking system using a piece of wireless communication equipment such as GPS (Global Positioning System), or an ultrasonic receiver.

The trajectory information input unit 1 is desirably installed to be able to thoroughly detect the entire tracking region 50, but a partially undetectable blind angle may occur. This is because even if a plurality of items of trajectory information with different trajectory numbers occur due to interrupted tracking, the movement line information generation unit 3 described later can estimate a series of movement lines.

The ID information input unit 2 is a device for acquiring ID of a moving body in the tracking region 50. The ID information input unit 2 does not necessarily detect ID of a moving body when the moving body is present, and whether ID can be detected depends on a position of the moving body in the tracking region 50. For example, ID of a moving body close to the ID information input unit 2 is likely to be detected, and ID of a moving body far from the ID information input unit 2 is less likely to be detected.

One ID information input unit 2 is illustrated in FIG. 1, but a plurality of ID information input units 2 may be installed within the tracking region 50. Each ID information input unit 2 is previously assigned with ID information input unit ID (or identification information of the ID information input unit) for uniquely specifying an ID information input unit 2. The ID information input unit ID is employed for determining which ID information input unit 2 detects ID of a moving body. An example in which the ID information input unit ID is expressed in number will be described below, and the ID information input unit ID will be denoted as ID information input unit number. The ID information input unit ID may be expressed in any other than number.

The ID information input unit 2 inputs detected ID of a moving body, its detection time, and a detection position of the ID into the movement line information generation unit 3. When a plurality of TO information input units 2 are present, the ID information input unit 2 inputs its ID information input unit number together with the information into the movement line information generation unit 3. The tracking region 50 is previously divided depending on a position detection resolution of an employed sensor. Then, the ID information input unit 2 may input in which region among the divided regions in the tracking region 50 ID of a moving body is detected, as the detection position information, into the movement line information generation unit 3. The ID information input unit 2 may indicate a detection position by area ID for uniquely specifying each region of the divided tracking region 50. Alternatively, the ID information input unit 2 may express a region corresponding to an ID detection position in a 2D coordinate. Each ID information input unit 2 is arranged in each region of the divided tracking region 50, and when each region corresponds to each ID information input unit 2 on one-to-one basis, the ID information input unit 2 may express a region corresponding to an ID detection position by an ID information input unit number of the ID information input unit 2 itself.

The movement line information generation unit 3 holds a conversion table for converting information on positions in order to utilize a position coordinate of a moving position input from the trajectory information input unit 1 into the movement line information generation unit 3 and an ID detection position input from the ID information input unit 2 into the movement line information generation unit 3. Then, the movement line information generation unit converts either the position coordinate input from the trajectory information input unit 1 or the detection position input from the ID information input unit 2, or both of them. The movement line information generation unit 3 may convert a position coordinate input from the trajectory information input unit 1 into a coordinate system employed in the ID information input unit 2. Alternatively, the movement line information generation unit 3 may convert a detection position input from the ID information input unit 2 into a coordinate system employed in the trajectory information input unit 1. Further, the movement line information generation unit 3 may convert a position coordinate input from the trajectory information input unit 1 and a detection position input from the ID information input unit 2 into another coordinate system.

For example, when a detection position is expressed by area ID in the ID information input unit 2, the movement line information generation unit 3 may hold a conversion table indicating an association between each area ID and a group of vertex position coordinates of each area ID expressed in a coordinate system employed in the trajectory information input unit 1. For example, when a detection position is expressed by an ID information input unit number in the ID information input unit 2, the movement line information generation unit 3 may hold a conversion table indicating an association between an ID information input unit number and an installation position of each ID information input unit 2 expressed in a coordinate system employed in the trajectory information input unit 1.

When trying to detect ID of a moving body and not being able to detect ID, the ID information input unit 2 may input time and position of the moving body with "no" ID into the movement line information generation unit 3. Alternatively, the ID information input unit 2 inputs no information such as ID, and thus the movement line information generation unit 3 may determine that no ID of the moving body is detected at the time.

The ID information input unit 2 may be any device capable of detecting unique ID of a moving body and specifying its detection time and detection position. For example, when a moving body has an active RFID tag and employs the tag ID as ID of the moving body, an REID reader may be employed as ID information input unit 2. Further, when a moving body has an IC (Integrated Circuit) card and employs ID of the IC card as ID of the moving body, an IC card reader may be employed as ID information input unit 2. When a moving body has a wireless LAN terminal and employs a MAC (Media Access Control) address of the wireless LAN (Local Access Network) terminal as ID of the moving body, an access point may be employed as ID information input unit 2. When a unique barcode is printed per moving body, a barcode reader may be employed as ID information input unit 2. When a moving body is a person, the face, fingerprint, vein or the like of the person may be employed as ID, and an ID reader may be assumed as ID information input unit 2. The ID information input units 2 for different objects to be detected, such as face authentication device and RFID reader, may be employed together.

When a plurality of ID information input units 2 are installed in the tracking region 50, they may be installed such that their detection regions overlap on each other. Alternatively, they may be installed such that the detection regions do not overlap on each other.

Detecting a position coordinate of a moving body by the trajectory information input unit 1 and detecting ID of the moving body by the ID information input unit 2 are performed at the same time. When the trajectory information input unit 1 and the ID information input unit 2 asynchronously detect a position coordinate and ID, respectively, the movement line information generation unit 3 may buffer the position coordinate and the like input from the trajectory information input unit 1 and the ID and the like input from the ID information input unit 2, and may use the information stored in the buffer per certain period of time. Alternatively, when the trajectory information input unit 1 and the ID information input unit 2 are not synchronous in time, the movement line information generation unit 3 may set the same detection time for the input position coordinate and ID when the information from the trajectory information input unit 1 and the information from the ID information input unit 2 are input into the movement line information generation unit 3.

The movement line information generation unit 3 generates movement line information including an ID association score per ID calculated for trajectory information of a moving body, and information on a position coordinate and a detection time of the moving body by use of the information input from the trajectory information input unit 1 and the information input from the ID information input unit 2.

Figure 2:
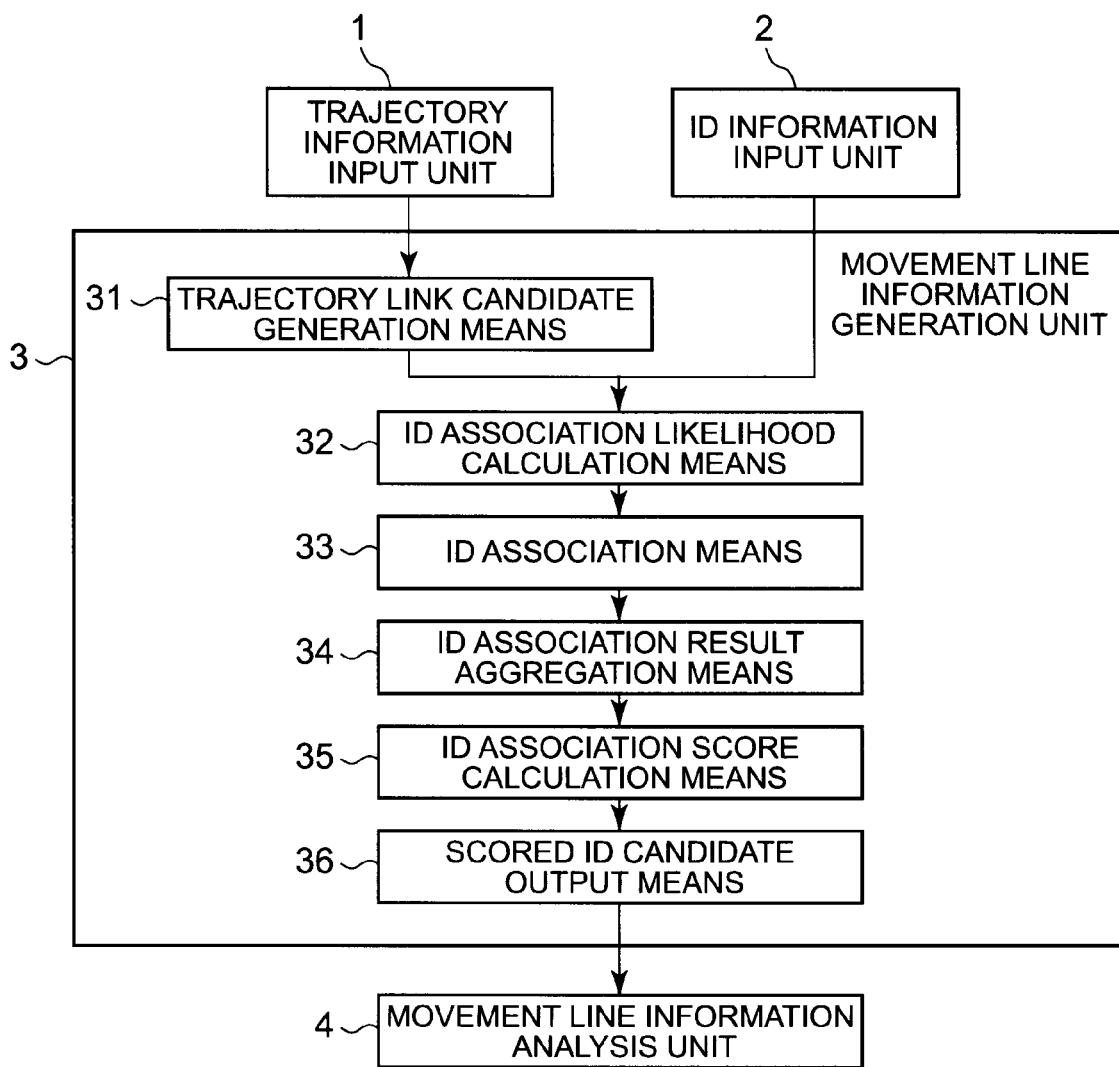
FIG. 2 It depicts a block diagram illustrating an exemplary structure of a movement line information generation unit.

FIG. 2 is a block diagram illustrating an exemplary structure of the movement line information generation unit 3. The trajectory information input unit 1, the ID information input unit 2 and the movement line information analysis unit 4 are also illustrated together. The movement line information generation unit 3 includes a trajectory link candidate generation means 31, an ID association likelihood calculation means 32, an ID association means 33, an ID association result aggregation means 34, an ID association score calculation means 35, and a scored ID candidate output means 36.

Figure 3:
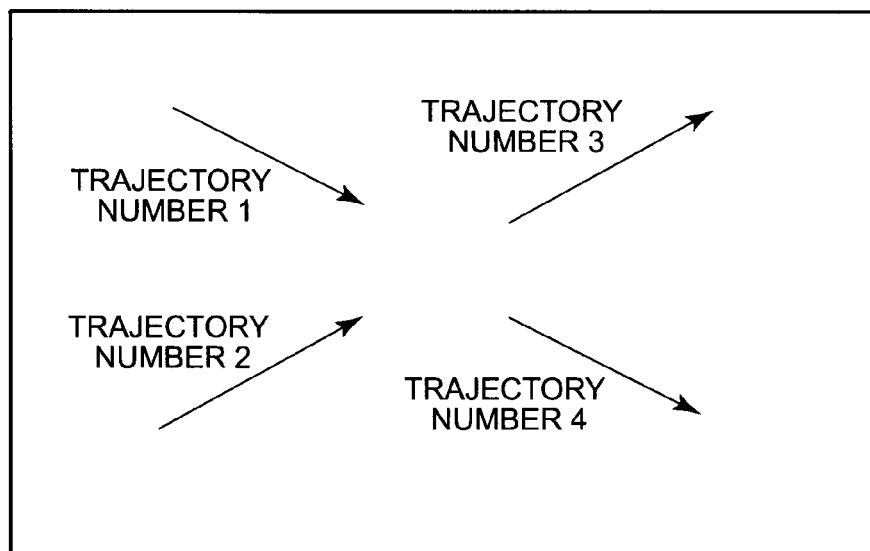
FIG. 3 It depicts a schematic diagram schematically illustrating trajectories expressed by trajectory information.

In the following description, a set of trajectory information capable of being assumed to express a trajectory of a moving body will be denoted as trajectory link. A set of trajectory links including all of trajectory information defined by position coordinate, detection time and trajectory number input from the trajectory information input unit 1 without omission and overlap will be denoted as trajectory link candidate. FIG. 3 is a schematic diagram schematically illustrating trajectories expressed by the trajectory information. Four trajectories corresponding to four items of trajectory information with trajectory numbers 1 to 4 are illustrated in FIG. 3. In the following description, each item of trajectory information with trajectory number 1, 2, 3, or 4 will be denoted as trajectory information 1, 2, 3 or 4, respectively. Exemplary trajectory links and trajectory link candidates will be described with reference to FIG. 3.

The trajectory information 1, 2, 3 and 4 can indicate a trajectory of one moving body, respectively. Therefore, individual trajectory information 1, 2, 3 and 4 corresponds to an independent trajectory link, respectively. A pair of trajectory information 1 and trajectory information 3 can be assumed to indicate a pair of segmented trajectories of one moving body. Thus, the pair of trajectory information and trajectory information 3 also corresponds to a trajectory link. Similarly, a pair of trajectory information 1 and trajectory information 4 and a pair of trajectory information 2 and trajectory information 3 also correspond to a trajectory link. There has been described herein the case in which one or two items of trajectory information are included in a trajectory link, but when n items of trajectory information are present, a trajectory link including one item of trajectory information, a trajectory link including two items of trajectory information, ..., and a trajectory link including n items of trajectory information can be assumed, respectively. In the example Illustrated in FIG. 3, a trajectory link including up to four items of trajectory information (or a set of trajectory information 1, 2, 3 and 4) is assumed.

As described above, a trajectory link candidate is a set of trajectory links including all of trajectory information without omission and overlap. Therefore, for example, it is assumed that individual items of trajectory information 1, 2, 3 and 4 are four independent trajectory links, respectively, and the trajectory information 1, 2, 3 and 4 indicates trajectory links 1, 2, 3 and 4, respectively. In this case, a set of trajectory links 1, 2, 3 and 4 can be assumed as a trajectory link candidate. The trajectory link candidate includes trajectory information 1, 2, 3 and 4 without omission and overlap.

For example, it is assumed that trajectory information 1 and 3 is one trajectory link and is indicated as trajectory link 13. Then, it is assumed that trajectory information 2 and 4 is independent trajectory links and is indicated as trajectory links 2 and 4, respectively. In this case, a set of trajectory links 13, 2 and 4 may be assumed as a trajectory link candidate.

A pair of trajectory information 1 and 3 and a pair of trajectory information 2 and 4 are assumed as separate trajectory links 13 and 24, respectively. In this case, two sets of trajectory links 13 and 24 may be assumed as trajectory link candidate.

For example, a set of trajectory information 1, 2, 3 and 4 is assumed as one trajectory link. In this case, the one trajectory link can be assumed as trajectory link candidate. The description has been made herein assuming a set of trajectory information 1, 2, 3 and 4 as one trajectory link for convenience, but tour segmented trajectories as illustrated in FIG. 3 are difficult to assume as trajectories of one moving body. When the trajectory link candidate generation means 31 generates a trajectory link, a set of trajectory information meeting a predetermined condition is not assumed as trajectory link.

In any case, the trajectory link candidate includes trajectory information 1, 2, 3 and 4 without omission and overlap.

An exemplary pair of trajectory links which is not assumed as trajectory link candidate will be described below. For example, it is assumed that a pair of trajectory information 1 and 3 is assumed as trajectory link 13 and a pair of trajectory information 1 and 4 is assumed as trajectory link 14. Then, the trajectory information 2 is assumed as trajectory link 2. In this case, the two pairs of the trajectory links 13 and 14 include the trajectory information in an overlapping manner, and thus do not correspond to a trajectory link candidate.

It is assumed that individual items of trajectory information 1, 2, 3 and 4 are four independent trajectory links 1, 2, 3 and 4, respectively. In this case, the pairs of trajectory links 1, 2 and 3 do not include the trajectory information 4. Thus, a set of trajectory links including only the trajectory links 1, 2 and 3 does not correspond to a trajectory link candidate.

The trajectory link candidate generation means 31 defines individual trajectory information based on all the information such as position coordinate, detection time, and trajectory number input from the trajectory information input unit 1, and generates trajectory links and trajectory link candidates by use of the trajectory information. The trajectory link candidate generation means 31 does not assume a set of trajectory information meeting a predetermined condition as described above as a trajectory link. Specifically, the trajectory link candidate generation means 31 does not assume a set of trajectory information meeting any one of the first and second conditions described later as trajectory link. That is, the trajectory link candidate generation means 31 prohibits a set of trajectory information meeting any one of the first condition and the second condition from being assumed as trajectory link.

The first condition is that a plurality of items of trajectory information including the same detection time are included in a set of trajectory information and a distance between the position coordinates of moving bodies detected at the same detection time included in the items of trajectory information is a predetermined threshold or more. The first condition is met, which indicates that the same moving body is present far away by the threshold or more at the same time. A set of trajectory information meeting the condition is not appropriate for being assumed as trajectory link, and the trajectory link candidate generation means 31 does not assume a set of trajectory information meeting the first condition as trajectory link.

The second condition will be described below. It is that a position coordinate at the oldest detection time is called start point and a position coordinate at the latest detection time is called end point in one item of trajectory information. The second condition is that when the respective items of trajectory information included in a set of trajectory information are arranged from the oldest detection time of the start point, a movement speed of a linear distance between the end point of previous trajectory information and the start point of next trajectory information, which is found based on the detection time and position of the end point of one item of trajectory information and the detection time and position of the start point of next trajectory information adjacent to a new time in the temporal axis, exceeds a predefined maximum movement speed of the moving body. The second condition is met, which indicates that the moving body is moving at a movement-impossible speed. A set of trajectory information meeting the condition is not appropriate for being assumed as trajectory link, and the trajectory link candidate generation means 31 does not assume a set of trajectory information meeting the second condition as trajectory link.

An obstacle or the like (not illustrated in FIG. 1) may be arranged in the tracking region 50 and path information indicating a path in which a moving body can move in the tracking region 50 may be previously defined. In this case, on determination of the second condition, the trajectory link candidate generation means 31 may find a distance along a movable path as a distance between the end point of previous trajectory information and the start point of next trajectory information, and may calculate a moving speed of the moving body based on the distance.

When the trajectory information input unit 1 inputs attribute information on a moving body into the movement line information generation unit 3, the third condition indicated below may be defined. The third condition is that for a plurality of items of trajectory information, it is determined that attribute information included in mutually different trajectory information is not similar by a similarity found by the attribute information included in the mutually different trajectory information. The trajectory link candidate generation means 31 may not assume a set of trajectory information meeting the third condition as trajectory link. The method for calculating a similarity between attribute information is not particularly limited. Whether the attribute information is similar to each other may be determined by comparing a similarity with a predefined threshold.

A set including only one item of trajectory information does not meet any of the first to third conditions, and the trajectory information is assumed as trajectory link.

When the upper limit number of trajectory link candidates is defined and the number of generated trajectory link candidates exceeds the upper limit number, the trajectory link candidate generation means 31 may prune the trajectory link candidates such that the number of trajectory link candidates is reduced below the upper limit number. The pruning reference is not particularly limited. For example, the trajectory link candidate generation means 31 may find a total sum of times when the detection times of the position coordinates of the trajectory information included in a trajectory link candidate overlap, and may sequentially exclude the trajectory link candidates from one with the longest time. The trajectory link candidate generation means 31 may find a total sum of interrupted times of the trajectory information in trajectory links included in a trajectory rink candidate, and may sequentially exclude the trajectory link candidates from one with the largest total sum of interrupted times. The trajectory link candidate generation means 31 may exclude the trajectory link candidates in descending order of trajectory links included in a trajectory link candidate (in other words, in descending order of moving bodies indicated by the trajectory link candidates).

When the trajectory information input unit 1 inputs attribute information on a moving body into the movement line information generation unit 3, the trajectory link candidate generation means 31 may calculate a similarity between the attribute information in the trajectory information in trajectory links included in a trajectory link candidate, and sequentially exclude the trajectory link candidates from one including a pair of trajectory information with a low similarity.

A combination of references may be employed as a reference for pruning the trajectory link candidates.

The ID association likelihood calculation means 32 generates all the possible pairs of trajectory link and ID (which will be denoted as trajectory link/ID pair below) by use of all the trajectory links generated by the trajectory link candidate generation means 31 and ID of all the moving bodies input from the ID information input unit 2 in a certain period of time. A trajectory link/ID pair indicates an association between a trajectory and ID of a moving body. The ID association likelihood calculation means 32 calculates a likelihood of the association per trajectory link/ID pair. That is, the ID association likelihood calculation means 32 calculates a likelihood indicating a trajectory of a moving body whose trajectory link is identified by ID. The likelihood will be denoted as ID association likelihood below.

A difference between the ID association likelihood and the ID association score will be described herein. The ID association likelihood and the ID association score are common in that they indicate how much an association between a trajectory and ID is appropriate, but are different in the following points. The ID association likelihood is a value calculated for associating a trajectory link with optimum ID, and is calculated in terms of an individual trajectory link. To the contrary, the ID association score is a value calculated based on an association trend between a trajectory link and ID in each trajectory link candidate after the ID is associated with the trajectory link belonging to the trajectory link candidate generated by the trajectory link candidate generation means 31 based on the ID association likelihood. The ID association likelihood is calculated for trajectory link while the ID association score is calculated for trajectory information.

The ID association likelihood calculation means 32 previously holds an ID output probability map. The ID output probability map defines therein a probability at which, when the tracking region 50 is divided and a moving body is present per divided area, ID of the moving body is detected by the ID information input unit 2. For the ID output probability map, an ID detection probability defined per area is denoted as ID output probability. The ID output probability map is previously created per ID information input unit 2, and the ID association likelihood calculation means 32 holds each ID output probability map, respectively. Each ID output probability map covers the entire tracking region 50.

An exemplary method for creating an ID output probability map will be described. For example, a moving body previously holding a terminal or tag issuing ID moves in each area in the tracking region 50. While the moving body is present in one area, one ID information input unit 2 tries to detect ID several times (10 times, for example), and counts the number of times when the ID information input unit 2 can detect ID. An ID output probability of the area is found based on the number of times when the ID information input unit 2 tries to detect ID and the number of times when it can actually detect ID. The same processing is performed per area so that an ID output probability map of the ID information input unit 2 can be created. When a plurality of ID information input units 2 are arranged, an ID output probability map may be created per ID information input unit 2 in the same way.

When calculating an ID association likelihood per trajectory link/ID pair, the ID association likelihood calculation means 32 selects an ID output probability map corresponding to the ID information input unit 2 which detects the ID of the moving body included in the trajectory link/ID pair. Then, the ID association likelihood calculation means 32 specifies a position coordinate of the moving body at each time when the ID of the moving body included in the trajectory link/ID pair is detected from the trajectory link included in the trajectory link/ID pair, and determines an ID output probability in the area including the position coordinate by the ID output probability map. The ID association likelihood calculation means 32 multiplies the ID output probabilities acquired at detection times of the ID. The multiplication result is an ID association likelihood.

The ID association likelihood calculation means 32 calculates a sum of logarithmic values of the ID output probabilities acquired at detection times of the ID, and may assume the calculation result as ID association likelihood.

The ID association means 33 performs a processing of associating each trajectory link included in a trajectory link candidate with likely ID (or likely ID of a moving body corresponding to a trajectory indicated by the trajectory link) for each trajectory link candidate based on an ID association likelihood calculated per trajectory link/ID pair. The ID association means 33 specifies a combination, where an ID association likelihood multiplication result is maximum, from among combinations of each trajectory link included in the trajectory link candidate and each ID, thereby to associate each trajectory link included in the trajectory link candidate with ID. The calculation for finding an ID association likelihood multiplication result is made in step S606 described later. The ID association means 33 does not assign the same ID to a plurality of trajectory links included in one trajectory link candidate. A result of maximum-likelihood ID association to a trajectory link included in a trajectory link candidate is called ID association candidate.

When ID of a moving body is not detected in the tracking region 50 and when a moving body with no ID is present, ID is not necessarily associated with all the trajectory links, respectively. Thus, when the number of ID of the moving bodies is smaller than the number of trajectory links included in a trajectory link candidate, the ID association means 33 associates information indicating that corresponding ID is not present with a trajectory link not associated with ID among the trajectory links included in the trajectory link candidate. For example, the ID association means 33 may associate "unknown" with a trajectory link included in a trajectory link candidate by use of a character string "unknown" as information indicating that corresponding ID is not present.

Conversely, when an ID tag left in the tracking region 50 is present, and when a moving body is present in a blind area of the trajectory information input unit 1, a position coordinate is not detected at all and only ID of the moving body is detected, the trajectory links are not necessarily associated with all the ID. Thus, when the number of detected ID is larger than the number of trajectory links included in the trajectory link candidate, the ID association means 33 associates ID with all the link candidates included in the trajectory link candidate. Then, the ID association means 33 assumes that a corresponding trajectory link is not present for the ID not associated with a link candidate, and does not associate ID with a link candidate.

When an integrated value of the ID association likelihood calculated for a trajectory link candidate is less than a predefined threshold, the ID association means 33 may determine that ID corresponding to the trajectory links included in the trajectory link candidate is not present.

The ID association result aggregation means 34 aggregates how many times trajectory information included in a trajectory link is associated with which ID per ID association candidate for all the ID association candidates acquired by the ID association means 33. When a trajectory link is associated with ID, the trajectory information included in the trajectory link is assumed to be also associated with the ID.

The ID association score calculation means 35 normalizes the number of times of association of each ID per trajectory information based on the frequency aggregation result (or the number of times when each ID is associated with each item of trajectory information) acquired by the ID association result aggregation means 34. According to the present exemplary embodiment, the ID association score calculation means 35 normalizes a value of the number of times found for each ID to be a total sum of 1. According to the present exemplary embodiment, each consequently-acquired value is assumed as ID association score. For example, it is assumed that a value of 0.2 is acquired for ID "1" and a value of 0.8 is acquired for ID "2", as to one trajectory information. In this case, an ID association score for the trajectory information and ID "1" is 0.2, and an ID association score for the trajectory information and ID "2" is 0.8.

The scored ID candidate output means 36 generates a list of individual ID and ID association scores for the individual ID per trajectory information, and outputs it to the moves of line information analysis unit 4.

The movement line information analysis unit 4 analyzes and visualizes movement line information by use of the list of ID and ID association scores per trajectory information generated by the scored ID candidate output means 36.

Figure 4:
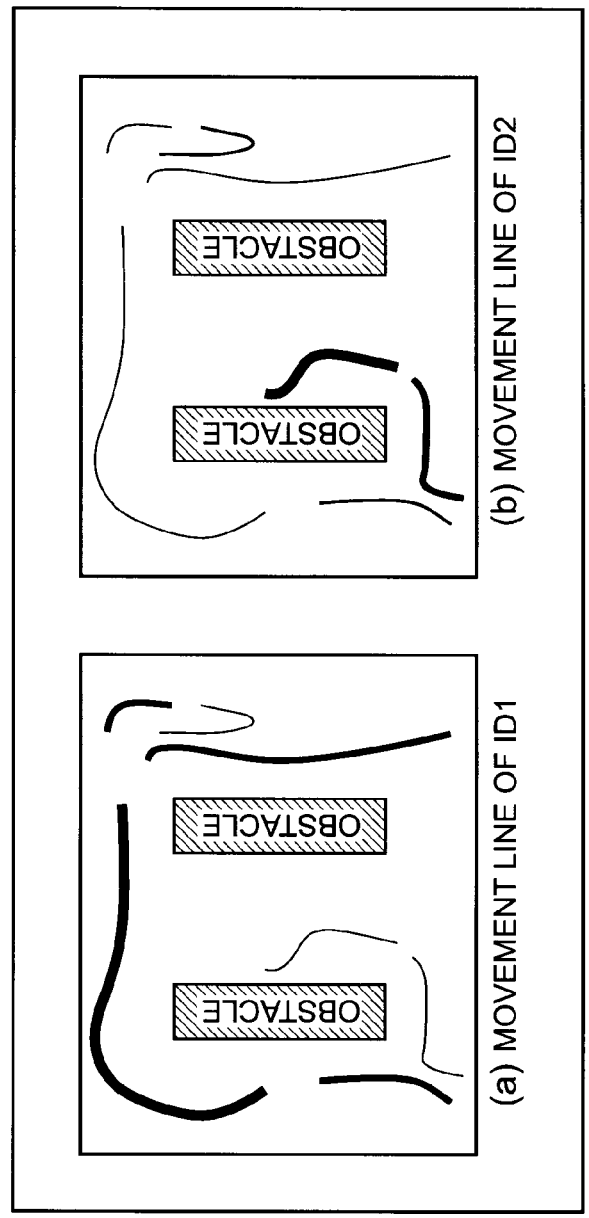
FIG. 4 It depicts a diagram illustrating an exemplary item of visualized movement line information.

Exemplary analysis and visualization of movement line information by the movement line information analysis unit 4 will be described. The movement line information analysis unit 4 may specify an ID association score of designated ID per individual trajectory information, and may display each movement line on the display device by changing a width of the movement line depending on the ID association score. The ID association score indicates how much an association between trajectory information and ID is ambiguous. Thus, the movement line information analysis unit 4 can indicate how much an association between trajectory information and ID is ambiguous and can visualize movement line information by changing a width of the trajectory indicated by the trajectory information depending on the ID association score. Exemplary thus-visualized movement line information is illustrated in FIG. 4. FIG. 4(*a*) illustrates how much an association is ambiguous when an individual trajectory indicated by each item of trajectory information is associated with ID "1." FIG. 4(*b*) illustrates how much an association is ambiguous when an individual trajectory indicated by each item of trajectory information is associated with ID "2." in FIG. 4(*a*), a wider trajectory indicates higher reliability of the association with ID "1." Similarly, in FIG. 4(*b*), a wider trajectory indicates higher reliability of the association with ID "2." The movement line information analysis unit 4 complements an interruption between trajectories and continuously chances a width of the movement line at the complemented part, thereby displaying a smoothly-linked movement line. In this case, the width of the line at the complemented part smoothly changes.

FIG. 4 indicates the cases in which a width of a trajectory indicated by trajectory information is changed depending on an ID association score, but a width of each trajectory may be the same and a density of the line of the trajectory indicated by trajectory information may be changed depending on an ID association score. For example, the movement line information analysis unit 4 may display a trajectory with a higher ID association score in a darker color and may display a trajectory with a lower ID association score in a lighter color. Also in this case, the movement line information analysis unit 4 may complement an interruption between trajectories and may display a smoothly-linked movement line by continuously changing the density of the movement line at the complemented part. In this case, the density of the line at the complemented part smoothly changes.

The analysis and visualization by the movement line information analysis unit 4 are not limited to the above example. Other exemplary analysis and visualization will be described below.

Figure 5:
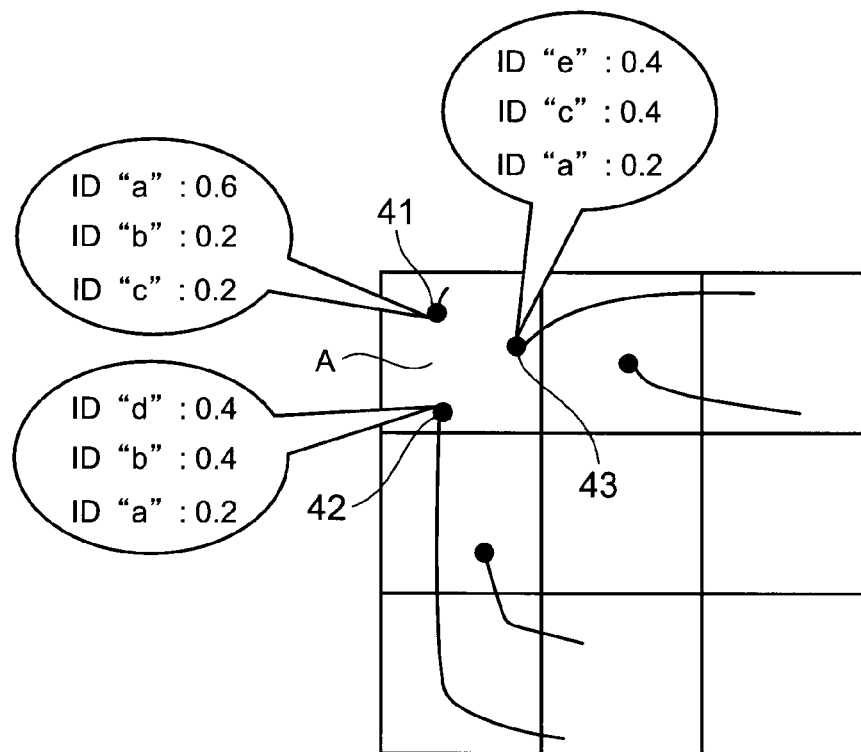
FIG. 5 It depicts an explanatory diagram illustrating an example in which associations between a set of moving bodies and a set of ID are derived.

When an area with a higher density of moving bodies is present in the areas in the divided tracking region 50, many moving bodies are present and thus individual moving bodies in the area are difficult to associate with ID of the moving bodies on one-to-one basis, respectively. Thus, the movement line information analysis unit 4 may display an association between a set of moving bodies in the area and a set of ID of the moving bodies for the area with a density of the moving bodies which has a predetermined value or more. The area may be the same area as each area in the ID output probability map, or may be an area acquired by dividing the tracking region 50 in a user-designated form. FIG. 5 is an explanatory diagram illustrating an example in which an association between a set of moving bodies and a set of ID is derived. The example illustrated in FIG. 5 indicates that the tracking region 50 is divided into nine areas. It is assumed that three moving bodies 41, 42 and 43 are present in area A among the nine areas and the movement line information analysis unit 4 determines that a density of the moving bodies is high in area A. In this case, the movement line information analysis unit 4 calculates a sum of ID association scores per ID with reference to the ID association score per ID calculated for trajectory information of each moving body in area A. The movement line information analysis unit 4 does not employ the ID association scores for the moving bodies not present in area A for the calculation. The ID association scores of 0.6, 0.2 and 0.2 for ID "a" are acquired for area A illustrated in FIG. 5, and thus the movement line information analysis unit 4 calculates a sum of them 0.6+0.2+0.2=1.0. The movement line information analysis unit 4 calculates a sum of ID association scores per ID for other IDs "b", "c", "d" and "e." The calculation results are as follows.

ID "a": 0.6+0.2+0.2=1.0
ID "b": 0.2+0.4=0.6
ID "c": 0.2+0.4=0.6
ID "d": 0.4
ID "e": 0.4

The movement line information analysis unit 4 may indicate that the three moving bodies 41 to 43 present in area A can be associated with the three higher IDs "a", "b" and "c" of the sum of ID association scores and a set of moving bodies 41 to 43 is associated with a set of IDs "a", "b" and "c." When a density of moving bodies is higher and a one-to-one association between a moving body and ID is difficult, the movement line information analysis unit 4 may display a result of the association between the set of moving bodies and the set of IDs.

Figure 6:
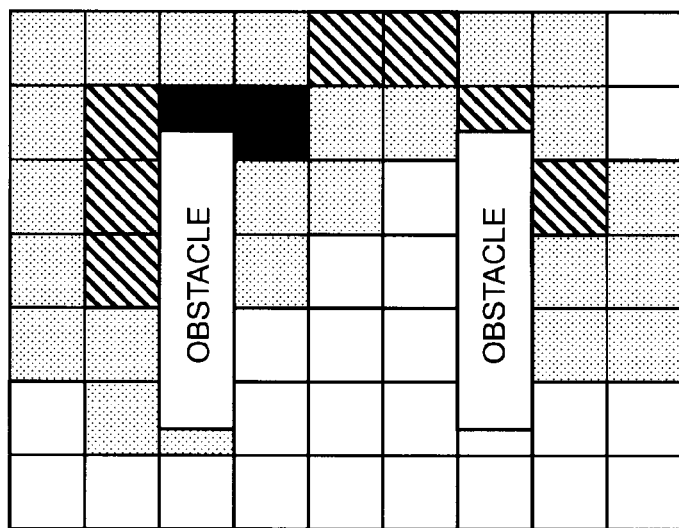
FIG. 6 It depicts an explanatory diagram illustrating an example in which an analysis result is displayed in a heat map form.

Further, the movement line information analysis unit 4 may display a possibility that a moving body having a user-designated attribute is present per area. The example described later assumes that the movement line information analysis unit 4 can access a storage device storing therein a database in which ID of each moving body is associated with the attribute of the moving body. The movement line information analysis unit 4 defines each area whose size is designated by the user and is acquired by dividing the tracking region 50 by the size, for example. Further, the movement line information analysis unit 4 is input with information having a user-designated attribute. For example, it is assumed that an attribute of "women in 40s" or the like is designated. Then, the movement line information analysis unit 4 reads a group of IDs of the moving bodies corresponding to the designated attribute from the database, and selects movement line information matching with the group of IDs. The movement line information analysis unit 4 determines a moving body with which ID is present in which area at what time based on the selected movement line information. Then, the movement line information analysis unit 4 cumulatively adds the scores of the ID corresponding to the designated attribute among the ID of the moving bodies present in the area for each area at each time. An area with a higher cumulative result may have a higher possibility that the designated attribute (women in 40s in the present example) is present. According to the addition result, the movement line information analysis unit 4 changes a display form of each area in the tracking region 50 thereby to display the tracking region 50. For example, the movement line information analysis unit 4 may display the tracking region 50 in a bit map form illustrated in FIG. 6.

The trajectory link candidate generation means 31, the ID association likelihood calculation means 32, the ID association means 33, the ID association result aggregation means 34, the ID association score calculation means 35 and the scored ID candidate output means 36 are realized by a CPU (Central Processing Unit) in a computer operating according to a movement line information generation program, for example. In this case, a program storage device (not illustrated) in the computer stores the movement line information generation program, and the CPU reads the program and may operate as the trajectory link candidate generation means 31, the ID association likelihood calculation means 32, the ID association means 33, the ID association result aggregation means 34, the ID association score calculation means 35 and the scored ID candidate output means 36 according to the program. The trajectory link candidate generation means 31, the ID association likelihood calculation means 32, the ID association means 33, the ID association result aggregation means 34, the ID association score calculation means 35 and the scored ID candidate output means 36 may be realized in separate hardware, respectively.

The operations will be described below.

Figure 7:
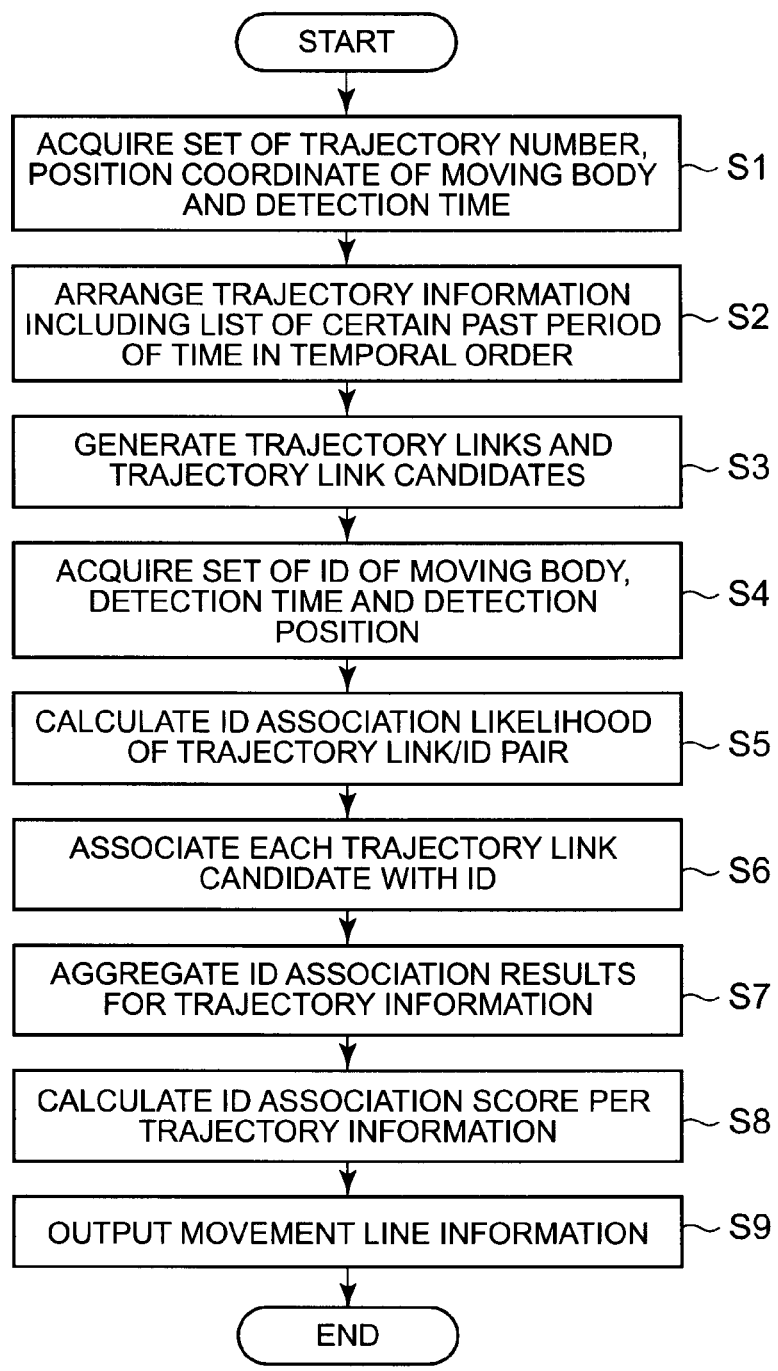
FIG. 7 It depicts a flowchart illustrating an exemplary processing progress of the movement line information generation unit.

FIG. 7 is a flowchart illustrating an exemplary processing progress of the movement line information generation unit 3. The trajectory link candidate generation means 31 acquires a set of trajectory number, position coordinate of a moving body and detection time from the trajectory information input unit 1 (step S1). The trajectory link candidate generation means 31 stores a get of sequentially input trajectory number, position coordinate and detection time as a data structure in which a list of detection times and position coordinates for a certain past period of time is held per trajectory number. For example, information on trajectory number 1 between times $t_1$ and $t_n$ is expressed as (trajectory number 1, (time $t_1$, x coordinate, y coordinate), (time $t_2$, x coordinate, y coordinate), . . . , (time $t_n$, x coordinate, coordinate)) or the like. That is, the trajectory link candidate generation means 31 generates and stores trajectory information including a trajectory number and a list of detection times and detection coordinates for a certain past period of time. Specifically, when a set of trajectory number, position coordinate and detection time is newly input, the trajectory link candidate generation means 31 may add a newly-input pair of position coordinate and detection time to the list corresponding to the trajectory number. The trajectory link candidate generation means 31 may delete the detection times and position coordinates before the certain past period of time from the list.

However, the trajectory link candidate generation means 31 holds the detection times of the position coordinates first assigned with trajectory numbers for each trajectory number without deletion. The time will be denoted as trajectory number assignment time below.

The trajectory link candidate generation means 31 then rearranges a group of trajectory information from a certain past time until a present time from the earliest trajectory number assignment time to the latest (step S2).

Figure 8:
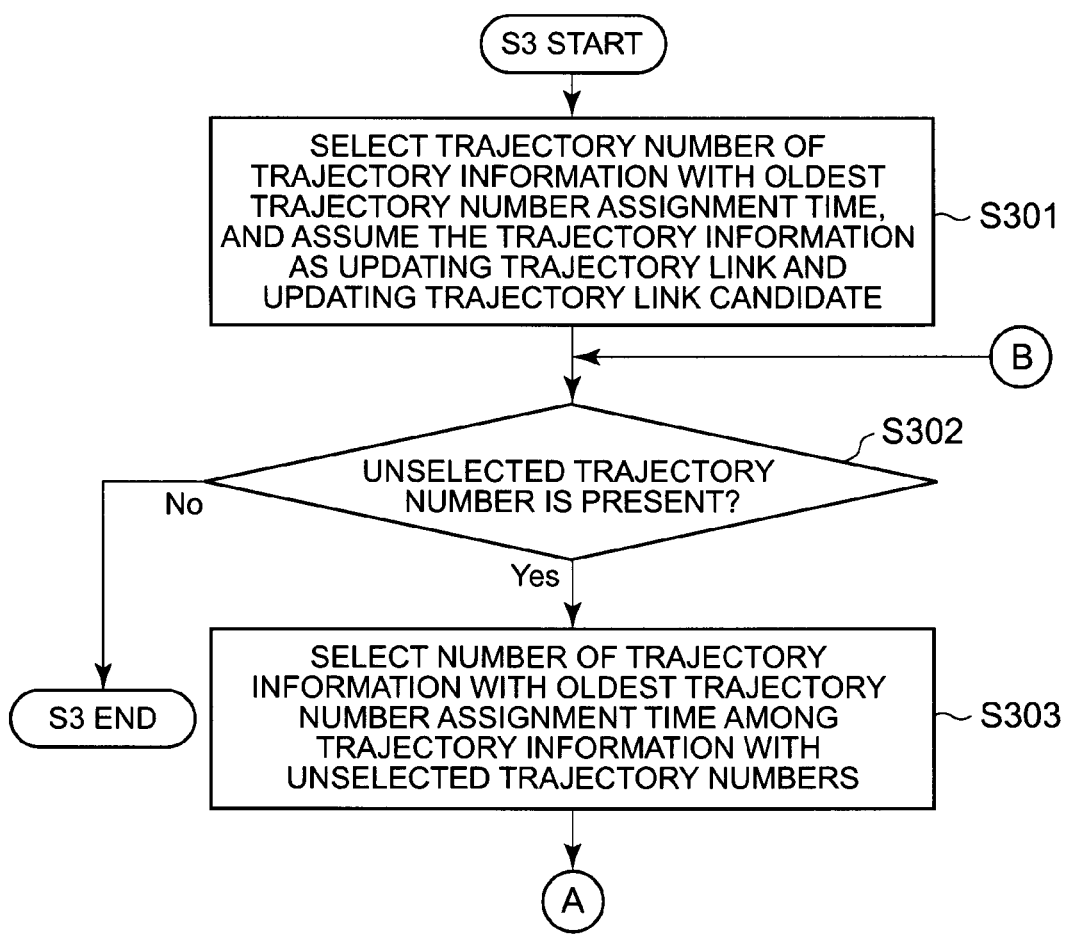
FIG. 8 It depicts a flowchart specifically illustrating the processing in step S3.
Figure 9:
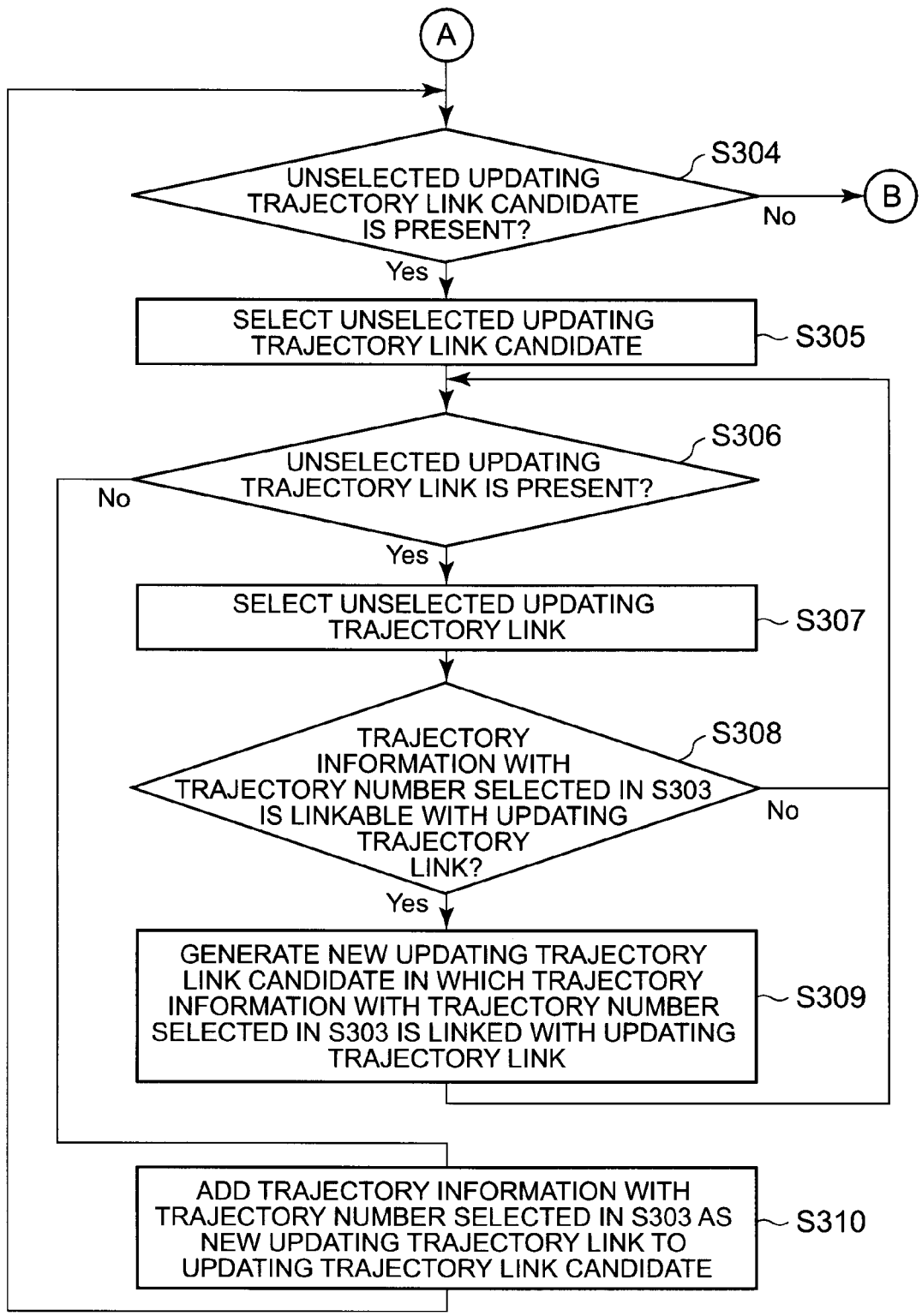
FIG. 9 It depicts a flowchart specifically illustrating the processing in step S3.
Figure 10:
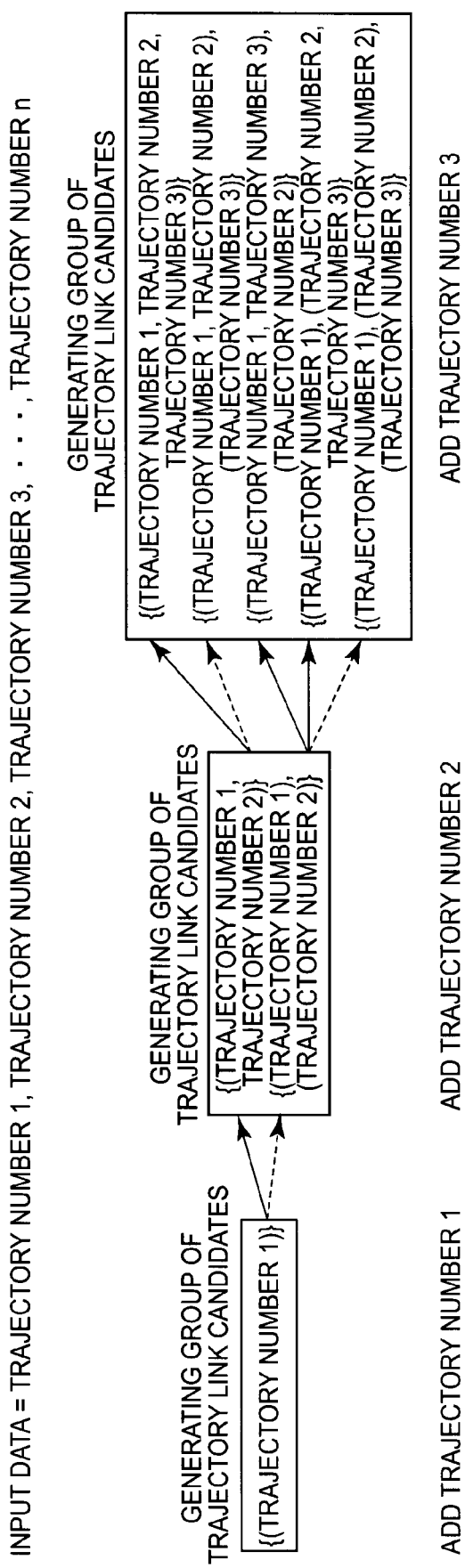
FIG. 10 It depicts a schematic diagram illustrating an exemplary process of generating trajectory links and trajectory link candidates.

The trajectory link candidate generation means 31 then generates trajectory links and trajectory link candidates by use of the group of trajectory information rearranged in step S2 (step S3). FIG. 8 and FIG. 9 are the flowcharts specifically illustrating the processing in step S3. FIG. 10 is a schematic diagram illustrating an exemplary progress of generating trajectory links and trajectory link candidates.

In step S3, the trajectory link candidate generation means 31 selects a trajectory number of trajectory information with the earliest trajectory number assignment time among the trajectory information rearranged in step S2 (see FIG. 7), and assumes the trajectory information as updating trajectory link and updating trajectory link candidate (step S301). The updating trajectory link is a trajectory link which is being generated. The updating trajectory link candidate is a trajectory link candidate which is being generated.

The example illustrated in FIG. 10 indicates trajectory links by listing the trajectory numbers in parentheses. Additionally, the trajectory links are listed in curly braces thereby to express a trajectory link candidate. For example, when trajectory information with trajectory number 1 is selected in step S301, the trajectory link candidate generation means 31 assumes the trajectory information as updating trajectory link (trajectory number 1). Further, the trajectory link candidate generation means 31 assumes the trajectory information as an updating trajectory link candidate {(trajectory number 1)}.

Better step S301, the trajectory link candidate generation means 31 determines whether a trajectory number unselected in steps S301 and S303 is present among the trajectory numbers of trajectory information (step S302). When it is determined that an unselected trajectory number is not present (No in step S302), the processing in step S3 is terminated.

When an unselected trajectory number is present (Yes in step S302), the trajectory rink candidate generation means 31 selects a trajectory number of trajectory information with the earliest trajectory number assignment time among the trajectory information with the unselected trajectory numbers (step S303). In the example illustrated in FIG. 10, the items of trajectory information with the trajectory numbers 1 to n are arranged in order of trajectory number assignment time. Then, trajectory number 1 is already selected in step S301, and thus the trajectory link candidate generation means 31 selects trajectory number 2.

Subsequently, the trajectory link candidate generation means 31 performs a processing of adding trajectory information with the trajectory number (trajectory number 2 herein) selected in step S303 to the updating trajectory link candidate and updating the updating trajectory link candidate. At first, the trajectory link candidate generation means 31 determines whether an updating trajectory link candidate unselected in step S305 is present among the updating trajectory link candidates generated at the end of step S303 (step S304). When an unselected updating trajectory link candidate is present, the trajectory link candidate generation means 31 selects one of the unselected updating trajectory link candidates (step S305). An example in which the above-described updating trajectory link candidate {(trajectory number 1)} is selected will be described herein.

The trajectory link candidate generation means 31 then determines whether an updating trajectory link unselected in step S307 is present among the updating trajectory links included in the updating trajectory link candidate selected in step S305 (step S306). When an updating trajectory link unselected in step S307 is present among the selected updating trajectory link candidate (Yes in step S306), the trajectory link candidate generation means 31 selects an unselected updating trajectory link from the updating trajectory link candidate (step S307). In the present example, (trajectory number 1) is selected from the updating trajectory link candidate {(trajectory number 1)}.

After step S307, the trajectory link candidate generation means 31 determines whether trajectory information with the trajectory number selected in step S303 can be linked with (or can be added to) the updating trajectory link selected in step S307 (step S308). In step S308, the trajectory link candidate generation means 31 may determine whether the linking is possible by determining whether a set of trajectory information in the updating trajectory link selected in step S307 and trajectory information with the trajectory number selected in step S303 meets the first condition and second condition described above. That is, when the set of trajectory information does not meet the first condition nor the second condition, the trajectory link candidate generation means 31 may determine that the trajectory information with the trajectory number selected in step S303 can be linked with the selected updating trajectory link. When the set of trajectory information meets at least either the first condition or the second condition, the trajectory link candidate generation means 31 may determine that the trajectory information with the trajectory number selected in step S303 cannot be linked with the selected updating trajectory link.

For example, in the present example, when the position coordinates of the moving bodies detected at the same detection time are included in the trajectory information with trajectory number 1 and the trajectory information with trajectory number 2, respectively, and the distance between the position coordinates is a threshold or more, the situation meets the first condition. In this case, the trajectory link candidate generation means 31 determines that the trajectory information with trajectory number 2 cannot be linked with the updating trajectory link (trajectory number 1).

For example, the trajectory link candidate generation means 31 calculates a speed at which the moving body moves from the end point of the trajectory information with trajectory number 1 to the start point of the trajectory information with trajectory number 2 based on the detection time and position of the end point of the trajectory information with trajectory number 1 and the detection time and position of the start point of the trajectory information with trajectory number 2. If the speed exceeds a predefined maximum movement speed of the moving body, the set of trajectory information with trajectory numbers 1 and 2 meets the second condition. In this case, the trajectory link candidate generation means 31 determines that the trajectory information with trajectory number 2 cannot be linked with the updating trajectory link (trajectory number 1).

When the trajectory information input unit 1 inputs attribute information of a moving body into the movement line information generation unit 3 and the attribute information is included in trajectory information, the trajectory link candidate generation means 31 may determine whether a set of trajectory information meets the third condition. When the third condition is met, the trajectory link candidate generation means 31 may determine that the trajectory information with the trajectory number selected in step S303 cannot be linked with the updating trajectory link.

When the first and second conditions are met and it is determined that the linking is impossible in step S307 (No in step S308), the trajectory link candidate generation means 31 proceeds to step S306 again.

When the first and second conditions are not met and it is determined that the linking is possible in step S307 (Yes in step S308), the trajectory link candidate generation means 31 generates a new updating trajectory link candidate in which the trajectory information with the trajectory number selected in step S303 is linked with the updating trajectory link selected in step S307 among the updating trajectory links in the trajectory link candidate selected in step S305 (step S309). In the present example, the trajectory Think candidate generation means 31 generates a new updating trajectory link candidate {(trajectory number 1, trajectory number 2)} in which the trajectory information with trajectory number 2 is added to (trajectory number 1) in the updating trajectory link candidate {(trajectory number 1)}.

After step S309, the trajectory link candidate generation means 31 proceeds to step S306 again.

When proceeding to step S306 after step S308 or step S309, the trajectory link candidate generation means 31 determines whether an updating trajectory link unselected in step S307 is present among the updating trajectory links included in the updating trajectory link candidate selected in step S305 (step S306). In the present example, the trajectory link candidate generation means 31 determines that (trajectory number 1) is already selected in the updating trajectory link candidate {(trajectory number 1)} selected in step S305 and other unselected updating trajectory link is not present.

When determining that an unselected updating trajectory link is not present in step S306 (No in step S306), the trajectory link candidate generation means 31 assumes the trajectory information with the trajectory number selected in step S303 as a new updating trajectory link and adds the updating trajectory link to the updating trajectory link candidate selected in step S305 (step S310). In the present example, the trajectory link candidate generation means 31 selects the trajectory information with trajectory number 2 in step S303, and assumes the trajectory information as a new updating trajectory link (trajectory number 2). Further, the trajectory link candidate generation means 31 selects an updating trajectory link candidate {(trajectory number 1)} in step S305. Therefore, the trajectory link candidate generation means 31 adds the updating trajectory link (trajectory number 2) to the updating trajectory link candidate {(trajectory number 1)}, and assumes it as an updating trajectory link candidate {(trajectory number 1), (trajectory number 2)}.

In the processings in steps S304 to S310 described above, when selecting the updating trajectory link candidate {(trajectory number 1)} and proceeding to step S309, the trajectory link candidate generation means 31 generates a new updating trajectory link candidate {(trajectory number 1, trajectory number 2)}. Further, the trajectory link candidate generation means 31 assumes {(trajectory number 1)} as {(trajectory number 1), (trajectory number 2)} in step S310. Therefore, when at least {(trajectory number 1), (trajectory number 2)} is generated in step S310 based on {(trajectory number 1)}, and the processing proceeds to step S309, {(trajectory number 1, trajectory number 2)} is also generated. In this way, when the processing proceeds to step S309, the number of updating trajectory link candidates increases. In step S310, the updating trajectory link candidate selected in step S305 is updated.

As to whether the updating trajectory link candidate generated in step S309 and the updating trajectory link candidate updated in step S310 are selected in step S305, both of them are initialized as unselected. Further, as to whether each updating trajectory link included in the updating trajectory link candidate is selected in step S307, it is initialized as unselected.

The upper limit number of trajectory link candidates may be defined. In this case, when the number of updating trajectory link candidates exceeds the upper limit number in step S310, the trajectory link candidate generation means 31 may prune the updating trajectory link candidates below the upper limit number. As previously described, the pruning reference is not particularly limited. In step S310, the trajectory link candidate generation means 31 may find a total sum of overlapped times when the position coordinates of the trajectory information included in the updating trajectory link candidate are detected, and may sequentially exclude the updating trajectory link candidates from one with the longest time. The trajectory link candidate generation means 31 may find a total sum of interruption times between the trajectory information in each updating trajectory link included in the updating trajectory link candidate, and may sequentially exclude the updating trajectory link candidates from one with the largest total sum of interruption times. The trajectory link candidate generation means 31 may exclude the trajectory link candidates in descending order of updating trajectory links included in an updating trajectory link candidate. When attribute information of a moving body is included in trajectory information, the trajectory link candidate generation means 31 may calculate a similarity of the attribute information in the trajectory information between the trajectory information in the updating trajectory links included in the updating trajectory link candidate, and may sequentially exclude the updating trajectory link candidates including a pair of trajectory information with a low similarity.

After step S310, the trajectory link candidate generation means 31 proceeds to step S304 again and performs the operations in and subsequent to step S304. In the present example, the updating trajectory link candidate generated at the end of step S303 is only {(trajectory number 1)} and {(trajectory number 1)} is already selected, and thus the trajectory link candidate generation means 31 determines that an unselected updating trajectory link candidate is not present (No in step S304).

When an unselected updating trajectory link candidate is not present among the updating trajectory link candidates generated at the end of step S303 (No in step S304), the trajectory link candidate generation means 31 proceeds to step S302. The trajectory link candidate generation means 31 then performs the processings in and subsequent to step S302.

For example, it is assumed that when the processing proceeds to step S302, two updating trajectory link candidates {(trajectory number 1, trajectory number 2)} and {(trajectory number 1), (trajectory number 2)} are generated as in the above example. The trajectory link candidate generation means 31 then determines that an unselected trajectory number is present in step S302, and assumes that trajectory number 3 is selected.

It is assumed that the trajectory link candidate generation means 31 determines that an unselected updating trajectory link candidate is present in step S304 and selects {(trajectory number 1, trajectory number 2)} in step S305, for example. In this case, the trajectory link candidate generation means 31 selects (trajectory number 1, trajectory number 2) in step S307, and then proceeds to step S309 to generate a new updating trajectory link candidate {(trajectory number 1, trajectory number 2, trajectory number 3)}. When proceeding to step S310, the trajectory link candidate generation means 31 updates {(trajectory number 1, trajectory number 2)} to {(trajectory number 1, trajectory number 2), (trajectory number 3)}.

Further, the trajectory link candidate generation means 31 determines that an unselected updating trajectory link candidate is present in step S304 again, and selects {(trajectory number 1), (trajectory number 2)} in step S305. In this case, the trajectory link candidate generation means 31 selects (trajectory number 1) in step S307 and then proceeds to step S309 to generate {(trajectory number 1, trajectory number 3), (trajectory number 2)} as a new updating trajectory link candidate. Further, the trajectory link candidate generation means 31 selects (trajectory number 2) in step S307 and then proceeds to step S309 to generate {(trajectory number 1), (trajectory number 2, trajectory number 3)} as a new updating trajectory link candidate. When proceeding to step S310, the trajectory link candidate generation means 31 updates {(trajectory number 1), (trajectory number 2)} to {(trajectory number 1), (trajectory number 2), (trajectory number 3)}.

When determining that an unselected updating trajectory link candidate is not present in step S304, the trajectory link candidate generation means 31 proceeds to step S302 again. When determining that an unselected trajectory number is not present in step S302 (No in step S302), the trajectory link candidate generation means 31 terminates the processing in step S3. Each updating trajectory link candidate acquired this time is confirmed as a trajectory link candidate. Each updating trajectory link included in each trajectory link candidate is confirmed as a trajectory link.

Figures 11, 12:
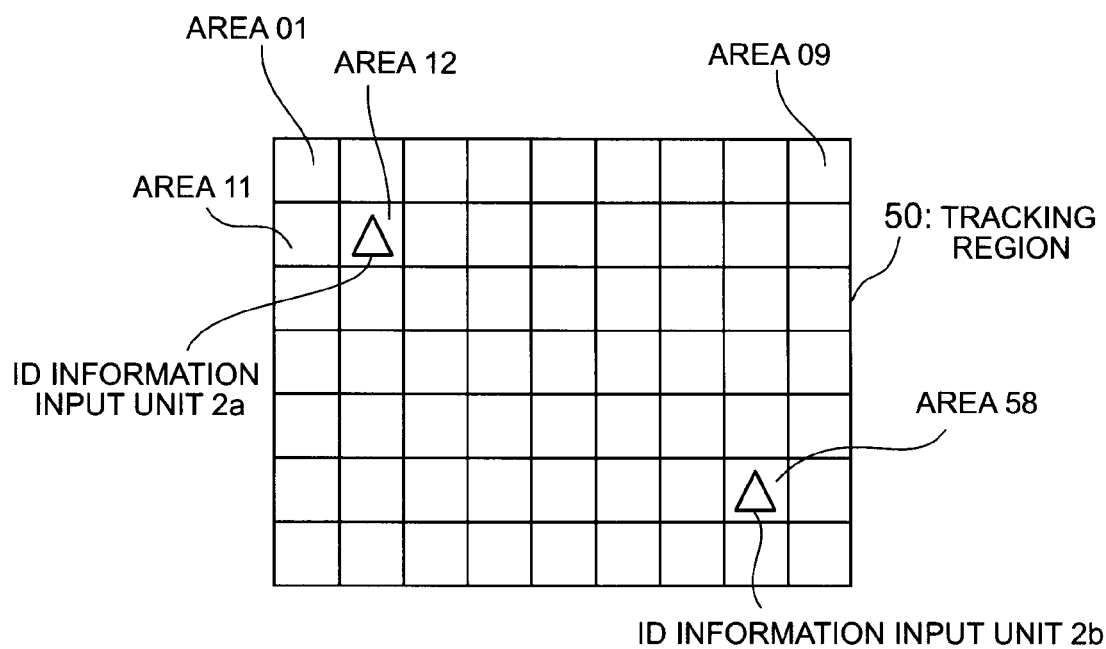
FIG. 11 It depicts an explanatory diagram illustrating each exemplary area which is a divided lattice tracking region.
FIG. 12 It depicts an explanatory diagram illustrating exemplary detection results by an ID information input unit.

The ID association likelihood calculation means 32 acquires ID for uniquely identifying a moving body, a detection time of the ID, and a detection position of the ID from the ID information input unit 2 (step S4). The ID information input unit 2 inputs the ID information input unit number of the ID information input unit 2 itself into the movement line information generation unit 3, and thus the ID association likelihood calculation means 32 acquires the ID information input unit number together. FIG. 11 illustrates each exemplary area acquired by dividing the tracking region 50 in a lattice manner. There will be described, in the present example, a case in which the ID association likelihood calculation means 32 acquires area ID of an area as a detection position from the ID information input unit 2. A set of ID, detection time and detection position acquired from the ID information input unit 2 will be denoted as ID information below. In the description of the present invention, "ID information" and "ID" included in ID information will be discriminated. "ID information" is a set of ID, detection time and detection position of a moving body. "ID" included in ID information is ID itself of a moving body.

The ID association likelihood calculation means 32 stores ID information for a certain past period of time. The length of "certain period of time" is the same as the length of "certain period of time" when a list of detection times and position coordinates for a certain past period of time is included in trajectory information.

The ID association likelihood calculation means 32 then generates all the possible trajectory link/ID pairs by use of each trajectory link generated in step S3 and ID of a moving body included in each ID information acquired in step S4. The ID association likelihood calculation means then calculates an ID association likelihood per trajectory link/ID pair (step S5). A specific example of ID association likelihood calculation will be described below. There will be assumed that two ID information input units 2a and 2b are arranged as illustrated in FIG. 11 by way of example. It is further assumed that ID information illustrated in FIG. 12, as ID information for a certain past period of time, is stored in the ID association likelihood calculation means 32. In the present example, it is assumed that the ID information input unit 2a detects ID at times t1, t2 and t3 and the ID information input unit 2b detects ID at times t9, t10 and t11.

Figure 13:
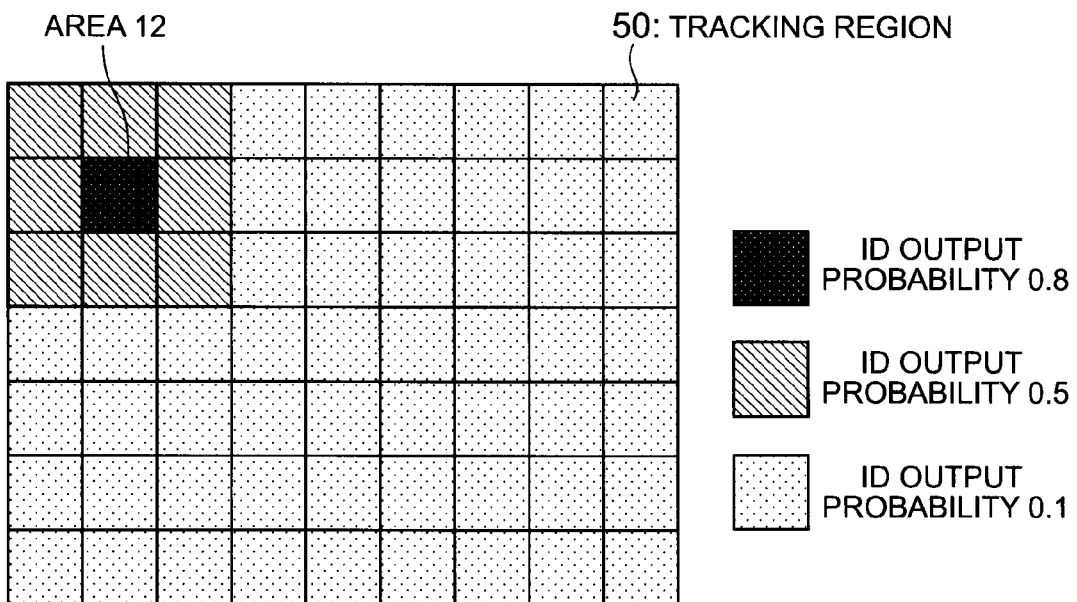
Figure 14:
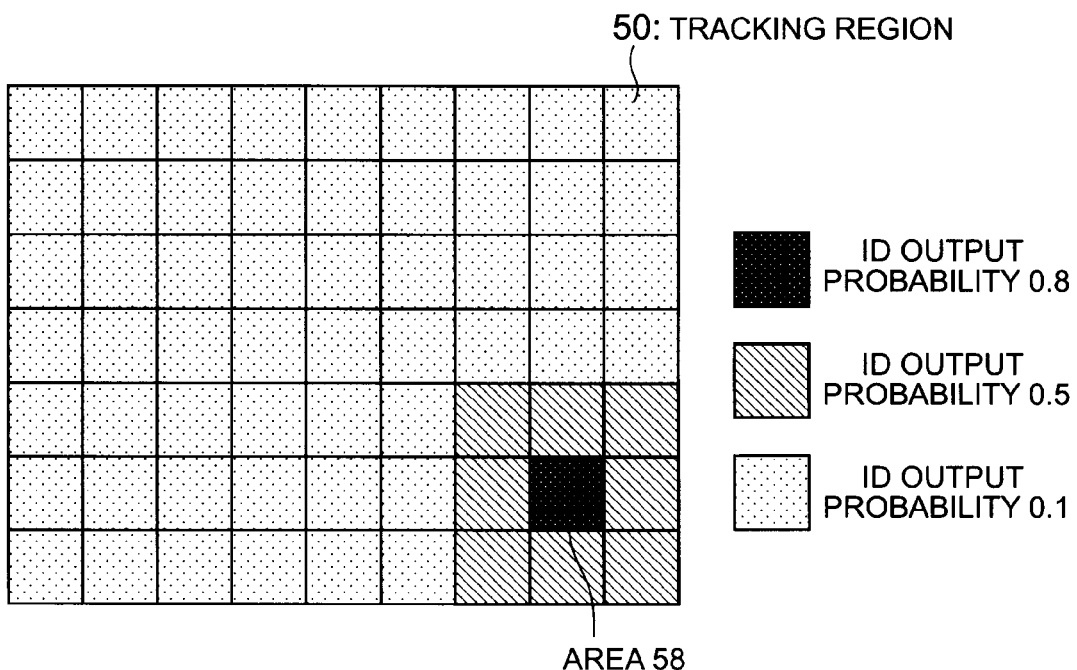
FIG. 14 It depicts a schematic diagram of an ID output probability map corresponding to an ID information input unit 2b.

The ID association likelihood calculation means 32 previously stores therein an ID output probability map corresponding to the ID information input unit 2a and an ID output probability map corresponding to the ID information input unit 2b. FIG. 13 is a schematic diagram of the ID output probability map corresponding to the ID information input unit 2a. In the ID output probability map illustrated in FIG. 13, the ID output probability of area 12 in which the ID information input unit 2a is present is 0.8 and the ID output probability of eight surrounding areas thereof is 0.5. Additionally, the ID output probability of other areas is 0.1. FIG. 14 is a schematic diagram of the ID output probability map corresponding to the ID information input unit 2b. In the ID output probability map illustrated in FIG. 14, an ID output probability of area 58 in which the ID information input unit 2b is present is 0.8 and the ID output probability of eight surrounding areas thereof is 0.5. Additionally, the ID output probability of other areas is 0.1.

Figure 15:
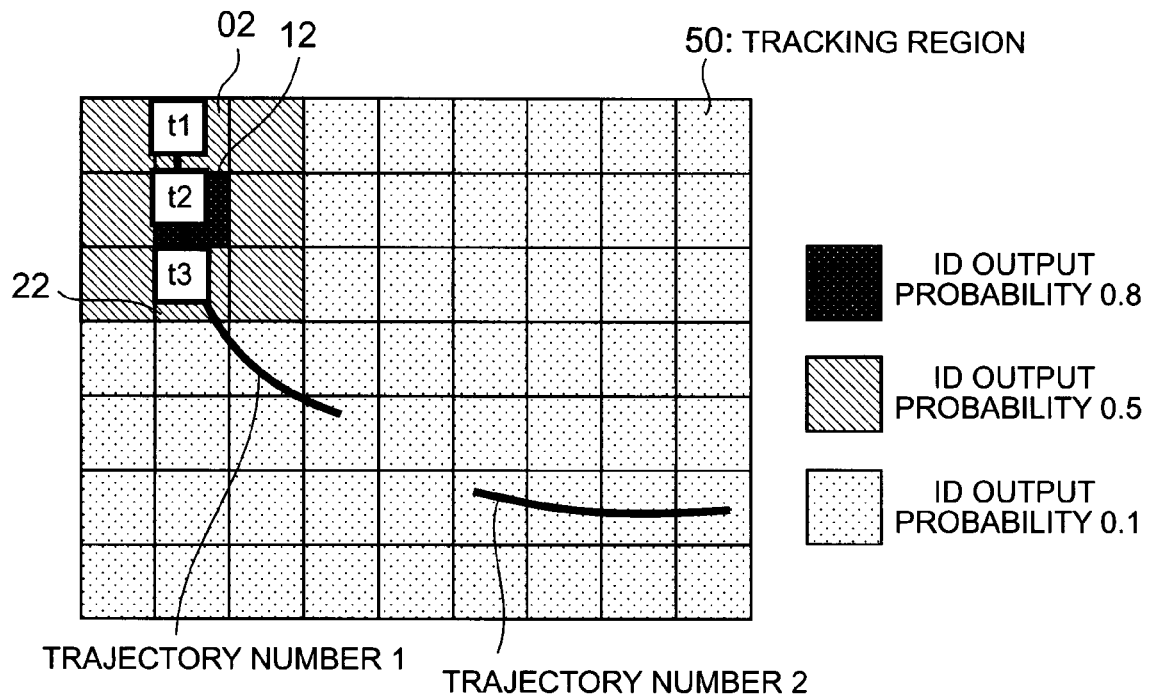
FIG. 15 It depicts a schematic diagram schematically illustrating trajectory links on an ID output probability map in an overlapped manner.
Figure 16:
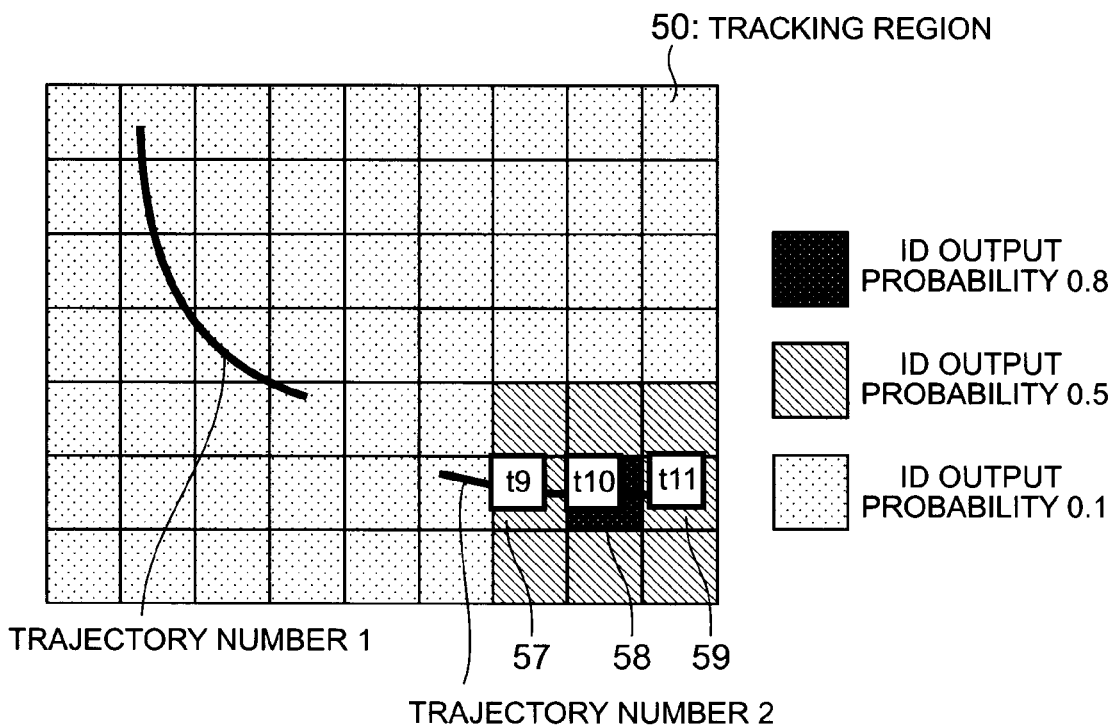
FIG. 16 It depicts schematic diagram schematically illustrating trajectory links on an ID output probability map in an overlapped manner.

FIG. 15 and FIG. 16 are the schematic diagrams schematically illustrating trajectory links overlapped on the ID output probability map. FIG. 15 and FIG. 16 illustrate trajectory links including trajectory information with trajectory numbers 1 and 2. In the following, the trajectory link is denoted as trajectory link A. FIG. 15 is a schematic diagram in which the trajectory link. A is overlapped on the ID output provability map corresponding to the ID information input unit 2a. FIG. 16 is a schematic diagram in which the trajectory link A is overlapped on the ID output probability map corresponding to the ID information input unit 2b.

Figure 17:
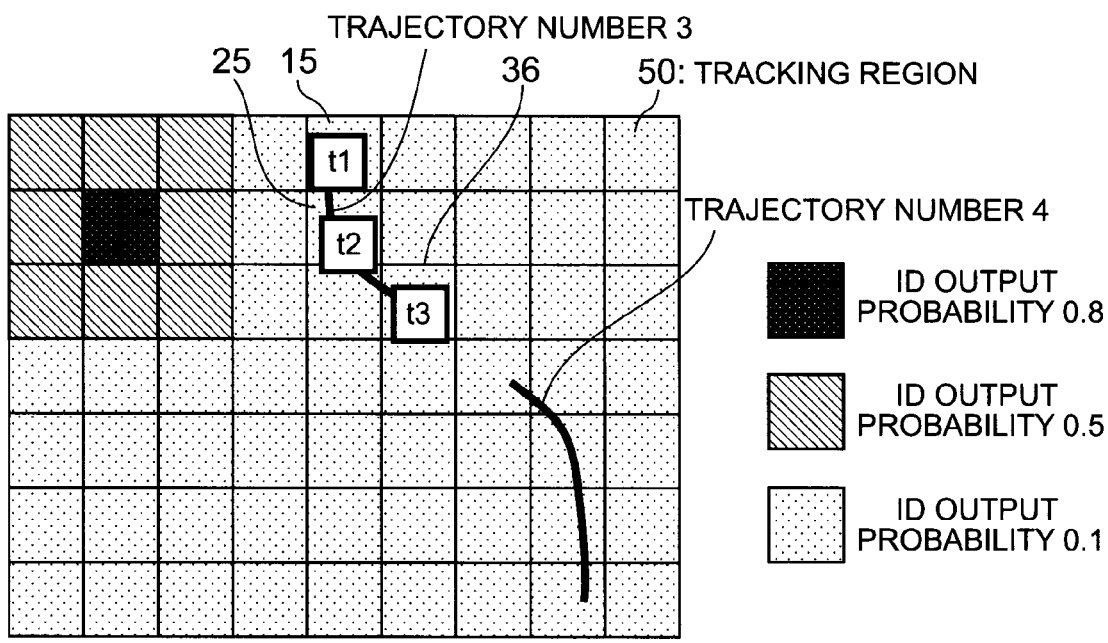
FIG. 17 It depicts a schematic diagram schematically illustrating trajectory links on an ID output probability map in an overlapped manner.
Figure 18:
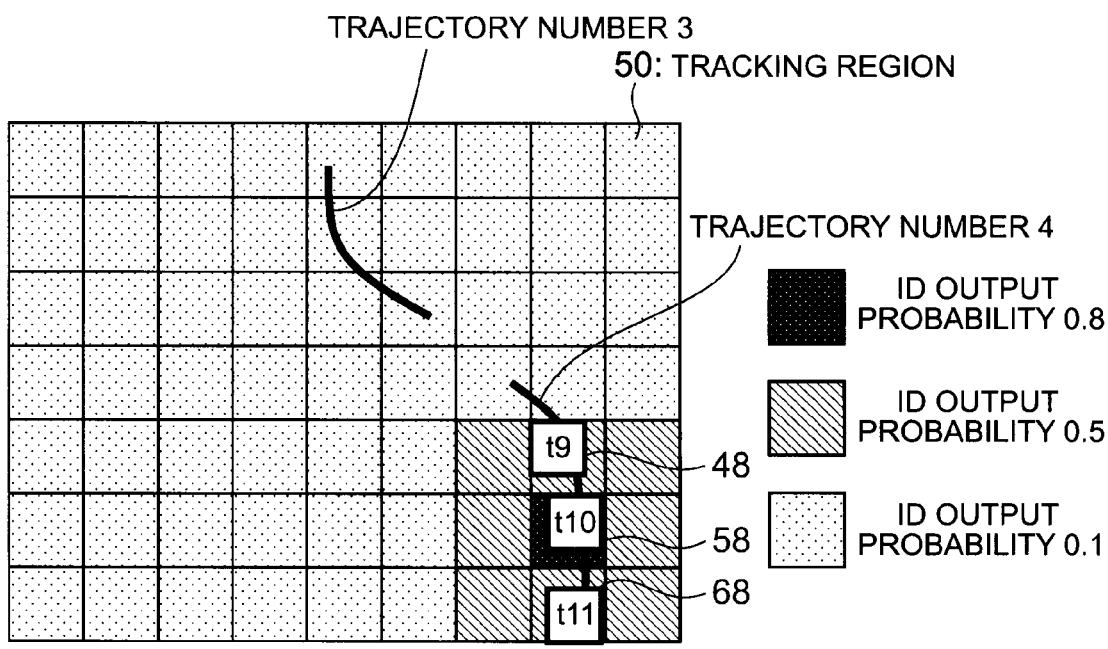
FIG. 18 It depicts schematic diagram schematically illustrating trajectory links on an ID output probability map in an overlapped manner.

Similarly, FIG. 17 and FIG. 18 are the schematic diagrams schematically illustrating trajectory links on the ID output probability map. FIG. 17 and FIG. 18 illustrate trajectory links including trajectory information with the trajectory numbers 3 and 4. The trajectory link will be denoted as trajectory link B below. FIG. 17 is a schematic diagram in which the trajectory link B is overlapped on the ID output probability map corresponding to the ID information input unit 2a. FIG. 18 is a schematic diagram in which the trajectory link B is overlapped on the ID output probability map corresponding to the ID information input unit 2b.

When calculating an ID association likelihood of a trajectory link/ID pair, the ID association likelihood calculation means 32 specifies each position of a moving body at each detection time of the ID configuring the trajectory link/ID pair based on the trajectory link configuring the trajectory link/ID pair. The ID association likelihood calculation means 32 then specifies an ID output probability at each position from the ID output probability map of the ID information input unit 2 detecting the ID. Further, the ID association likelihood calculation means 32 calculates a product of ID output probabilities and assumes the calculation result as an ID association likelihood. The ID association likelihood calculation means 32 may calculate a sum of logarithmic values of the specified ID output probabilities and may assume the calculation result as an ID association likelihood.

A process of calculating an ID association likelihood of a trajectory link/ID pair including the trajectory link A and ID1 (see FIG. 12) will be described. As illustrated in FIG. 12, ID1 is detected in area 12 at times t1, t2 and t3. ID1 is detected by the moving body input unit 2a (see FIG. 11). The ID association likelihood calculation means specifies a position of the moving body at detection time t1 of ID1 from the trajectory link A. As illustrated in FIG. 15, the position coordinate of the moving body at time t1 is present in area 02. The ID association likelihood calculation means 32 specifies area 02 as a position of the moving body at time t1 (see FIG. 15). Further, the ID association likelihood calculation means 32 acquires an ID output probability of 0.5 of area 02 from the ID output probability map of the moving body input unit 2a detecting ID1 at time t1. Similarly, the ID association likelihood calculation means 32 specifies a position of the moving body at detection time t2 of ID1 based on the trajectory link A. In this case, the ID association likelihood calculation means 32 specifies area 12. The ID association likelihood calculation means 32 then acquires an ID output probability of 0.8 of area 12 from the ID output probability map of the moving body input unit 2a detecting ID1 at time t2 (see FIG. 15). Similarly, the ID association likelihood calculation means 32 specifies area 22 as a position of the moving body at detection time t3 of ID1 and acquires an ID detection probability of 0.5 of area 22 from the ID output probability map of the moving body input unit 2a (see FIG. 15).

ID1 is detected in area 58 at times t9, t10 and t11. ID1 is detected by the moving body input unit 2b (see FIG. 11). The ID association likelihood calculation means 32 specifies area 57 as a position of the moving body at detection time t9 of ID1 based on the trajectory link A, and acquires an ID output probability of 0.5 of area 57 from the ID output probability map of the moving body input unit 2b detecting ID1 at time t9 (see FIG. 16). Similarly, the ID association likelihood calculation means 32 acquires an ID detection probability of 0.8 at detection time t10 of ID1, and acquires an ID detection probability of 0.5 at detection time t11 of ID1 (see FIG. 16).

The ID association likelihood calculation means 32 calculates a product of the ID output probabilities found at detection times t1, t2, t3, t9, t10 and t11 of ID1, and acquires 0.04. The value is an ID association likelihood of the pair of trajectory link A and ID1.

A progress of calculating an ID association likelihood of a trajectory link/ID pair including the trajectory link A and ID2 (see FIG. 12) will be described below. As illustrated in FIG. 12, ID2 is detected in area 58 at times t9, t10 and t11. ID2 is detected by the moving body input unit 2b (see FIG. 11). The ID association likelihood calculation means 32 specifies area 57 as a position of the moving body at detection time t9 of ID2 based on the trajectory link A, and acquires an ID detection probability of 0.5 of area 57 from the ID output probability map of the moving body input unit 2b (see FIG. 16). Similarly, the ID association likelihood calculation means 32 acquires an ID output probability of 0.8 at detection time t10 of ID2, and acquires an ID detection probability of 0.5 at detection time t11 of ID2 (see FIG. 16). The ID association likelihood calculation means 32 then calculates a product of the ID output probabilities found at detection times t9, t10 and t11 of ID2 and acquires 0.2. The value is an ID association likelihood of the pair of trajectory link A and ID2.

A progress of calculating an ID association likelihood of the trajectory link/ID pair including the trajectory link B and ID1 (see FIG. 12) will be described below. The ID association likelihood calculation means 32 specifies area 15 as a position of the moving body at detection time t1 of ID1 based on the trajectory link B. The ID association likelihood calculation means 32 then acquires an ID output probability of 0.1 of area 15 from the ID output probability map of the moving body input unit 2a detecting ID1 at time t1 (see FIG. 17). Similarly, the ID association likelihood calculation means 32 specifies area 25 as a position of the moving body at detection time t2 of ID1, and acquires an ID detection probability of 0.1 of area 25 from the ID output probability map of the moving body input unit 2a (see FIG. 17). Further, the ID association likelihood calculation means 32 specifies area 36 as a position of the moving body at detection time t3 of ID1, and acquires an ID detection probability of 0.1 of area 36 from the ID output probability map of the moving body input unit 2a (see FIG. 17).

Furthermore, the ID association likelihood calculation means 32 specifies area 48 as a position of the moving body at detection time t9 of ID1 based on the trajectory link B, and acquires an ID output probability of 0.5 of area 48 from the ID output probability map of the moving body input unit 2b detecting ID1 at time t9 (see FIG. 18). Similarly, the ID association likelihood calculation means 32 acquires an ID detection probability of 0.8 at detection t10 of ID1, and acquires an ID detection probability of 0.5 at detection time t11 of ID1 (see FIG. 18).

The ID association likelihood calculation means 32 calculates a product of the ID output probabilities found at detection times t1, t2, t3, t9, t10 and t11 of ID1, and acquires 0.0002. The value is an ID association likelihood of the pair of trajectory link B and ID1.

A progress of calculating an ID association likelihood of a trajectory link/ID pair including the trajectory link B and ID2 (see FIG. 12) will be described below. The ID association likelihood calculation means 32 specifies area 48 as a position of the moving body at detection time t9 of ID2 based on the trajectory link B, and acquires an ID detection probability of 0.5 of area 48 from the ID output probability map of the moving body input unit 2b (see FIG. 18). Similarly, the ID association likelihood calculation means 32 acquires an ID output probability of 0.8 at detection time t10 of ID2, and acquires an ID detection probability of 0.5 at detection time t11 of ID2 (see FIG. 18). The ID association likelihood calculation means 32 then calculates a product of the ID output probabilities found at detection times t9, t10 and t11 of ID2, and acquires 0.2. The value is an ID association likelihood of the pair of trajectory link B and ID2.

With the similar procedure, the ID association likelihood calculation means 32 calculates the ID association likelihoods of all the trajectory link/ID pairs. When a position coordinate of a moving body at detection time of ID of the moving body is not detected, the ID association likelihood calculation means 32 may specify a position of the moving body at ID detection time and acquire an ID output probability at the position by interpolating or extrapolating trajectory information in the trajectory link.

Figure 19:
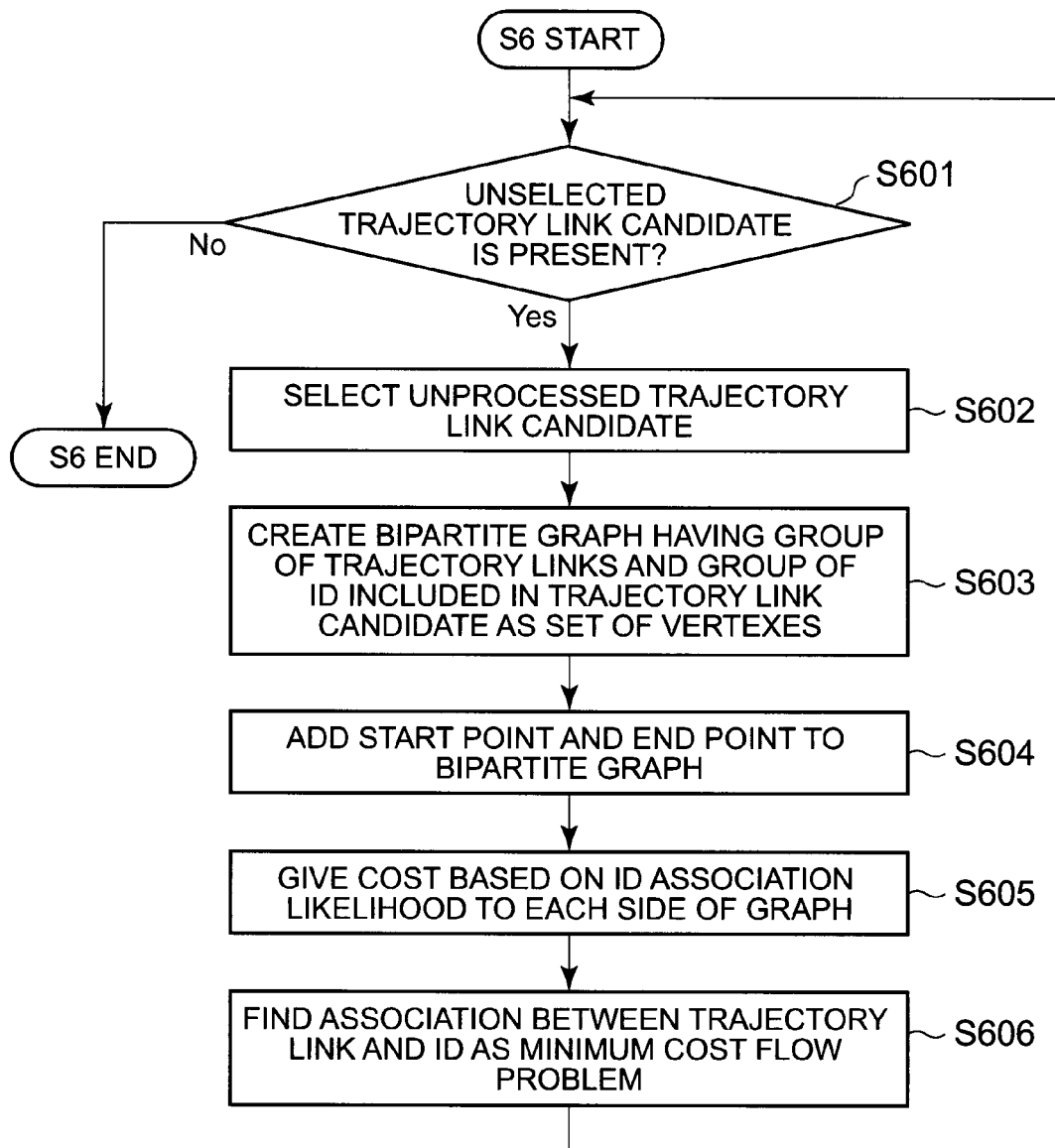
FIG. 19 It depicts a flowchart specifically illustrating the processing in step S6.

After step S5, the ID association means 33 associates each trajectory link included in trajectory link candidate with maximum-likelihood ID based on the ID association likelihood per trajectory link/ID pair calculated in step S5 (step S6). FIG. 19 is a flowchart specifically illustrating the processing in step S6.

In step S6, the ID association means 33 determines whether a trajectory link candidate unselected, in step S602 is present in the group of trajectory link candidates generated in step S3 (step S601). When an unselected trajectory link candidate is present (Yes in step S601), the ID association means 33 selects one trajectory link candidate unselected in step S602 from the group of trajectory link candidates generated in step S3 (step S602).

Figure 20:
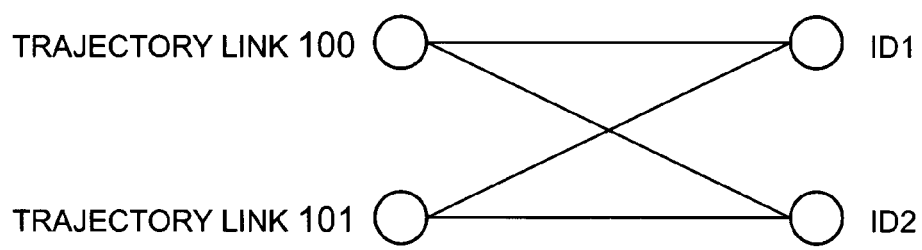
FIG. 20 It depicts a diagram illustrating a specific example of a bipartite graph created in step S603.

The ID association means 33 then creates a bipartite graph with each trajectory link included in the trajectory link candidate selected in step S602 as vertex and with each ID of a moving body as vertex (step S603). The ID association means 33 creates a bipartite graph without a side between the vertexes corresponding to the trajectory links and without a side between the vertexes corresponding to ID. FIG. 20 is a diagram illustrating a specific example of the bipartite graph created in step S603. The example illustrated in FIG. 20 indicates the bipartite graph with the trajectory links 100 and 101 as vertexes and with ID1 and ID2 as vertexes. The associations between the trajectory links 100, 101 and ID1, ID2 are found from the bipartite graph illustrated in FIG. 20.

Figure 21:
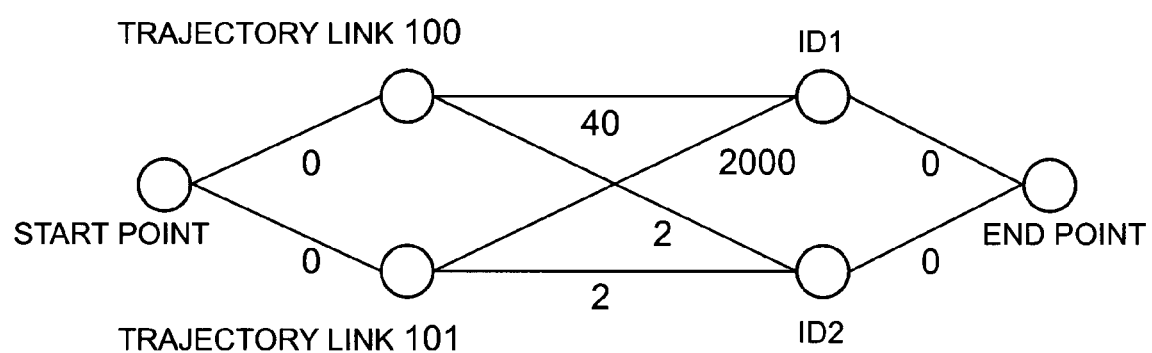
FIG. 21 It depicts a diagram illustrating an example in which the start point and the end point are added to the bipartite graph illustrated in FIG. 20.

After step S603, the ID association means 33 adds a node as start point and a node as end point to both the ends of the created bipartite graph (step S604). The ID association means 33 may add the start point linked to each vertex corresponding to the trajectory link and the end point linked with each vertex corresponding to ID to the bipartite graph. FIG. 21 illustrates an example in which the start point and the end point are added to the bipartite graph illustrated in FIG. 20. In FIG. 21, a value indicated on each side denotes cost set in step S605 described later.

Better step S604, the ID association means 33 sets cost at each side of the graph acquired in step S604 (step S605). The cost is a value indicating how much the nodes are easily associated with each other, and lower cost means an easier association between the nodes. The ID association means 33 may set, as cost, the reciprocal of an ID association likelihood of a trajectory link/ID pair pairing a trajectory link and ID for a side connecting a vertex corresponding to the trajectory link and a vertex corresponding to the ID. For example, when an ID association likelihood of the pair of trajectory link 100 and ID1 is 0.025, the ID association means 33 sets 40 which is the reciprocal of 0.025 as cost for the side connecting the trajectory link 100 and the ID1. Further, the ID association means 33 sets cost of the side connecting the start point and each vertex corresponding to a trajectory link at 0. Similarly, the ID association means 33 sets cost of the side connecting the end point and each vertex corresponding to ID at 0.

Furthermore, in step S605, the ID association means 33 sets the capacity of each side at "1." The capacity of an individual side is a value indicating how many paths can pass through a side when paths between the start point and the end point are defined. Therefore, in the example illustrated in FIG. 21, for example, after a path passing through the nodes in the order of "start point, trajectory link 100, ID1, end point" is defined, each capacity of the side between the nodes is in this case, the path between the trajectory link 100 and the ID1 indicates an association between a trajectory link and ID for one moving body. When a path corresponding to another moving body on the graph is searched, a side with a capacity of 0 cannot be searched.

After step S605, the ID association means 33 applies the minimum cost flow problem in the graph theory to the graph acquired in the processings up to step S605 thereby to find an association between a trajectory link and ID (step S606). In step S606, the ID association means 33 sets either smaller one of the number of trajectory links and the number of ID as a flow to be met. The ID association means 33 then applies the minimum cost flow problem in the graph theory to the graph acquired in the processings up to step S605 thereby to select a path with the smallest cost between the start point and the end point.

When the graph illustrated in FIG. 21 is acquired, both the number of trajectory links and the number of ID are 2, and thus the ID association means 33 assumes the flow at "2." The ID association means 33 then selects, as the paths whose total cost is minimum and meets the flow "2", two paths including the path passing through the nodes in the order of "start point, trajectory link 100, ID1, end point" and the path passing through the nodes in the order of "start point, trajectory link 101, ID2, end point."

A combination of trajectory link and ID included in the path selected in step S606 is a maximum-likelihood ID association result (ID association candidate) for each trajectory link in the trajectory link candidate selected in step S602.

After performing the processings up to step S606 on the trajectory link candidate selected in step S602, the ID association means 33 repeats the processings in and subsequent to step S601, and performs steps S602 to S606 per trajectory link candidate. Further, when an unselected trajectory link candidate is not present (No in step S601), the ID association means 33 terminates the processing in step S6.

Figure 22:
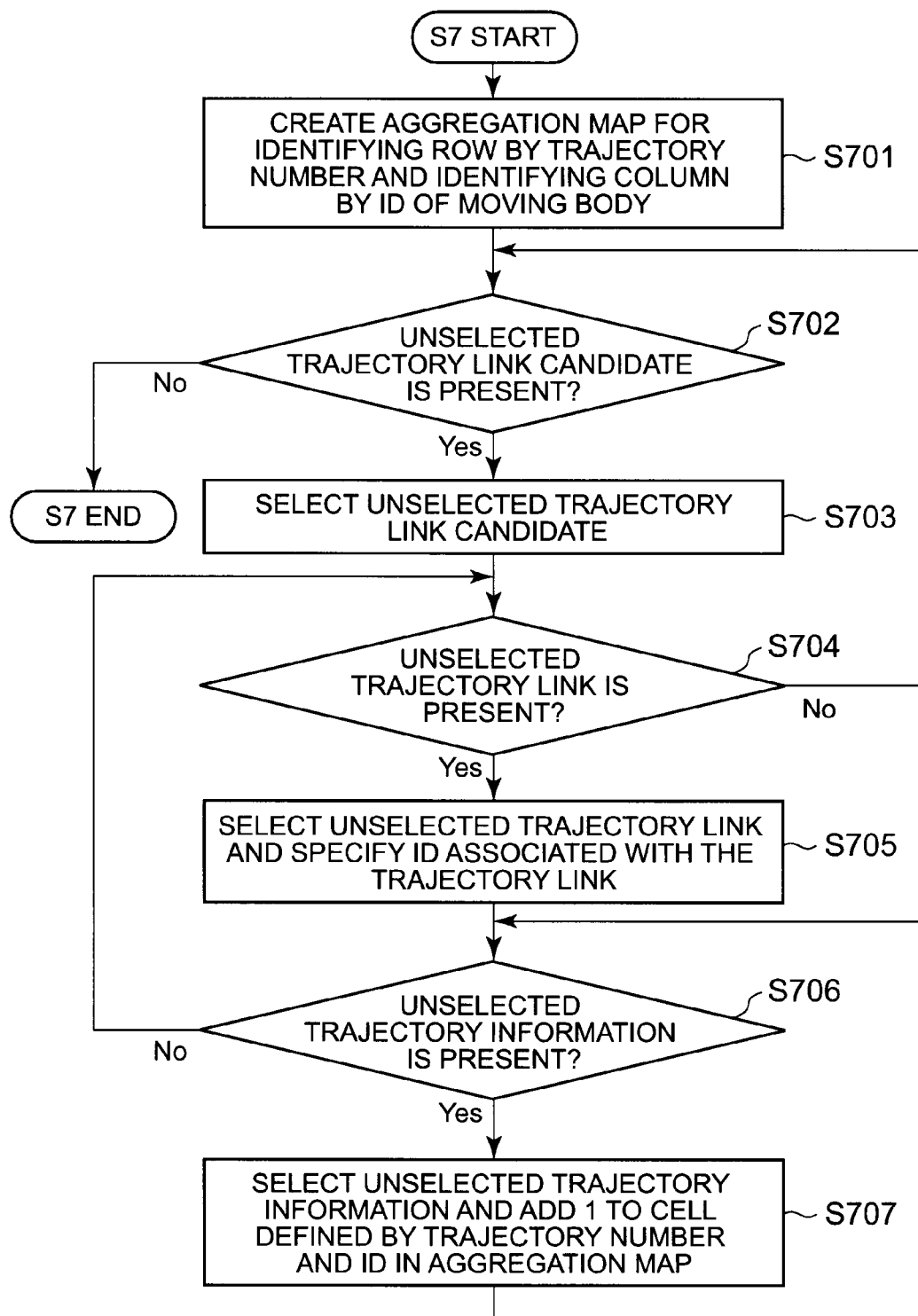
FIG. 22 It depicts a flowchart specifically illustrating the processing in step S7.

After step S6, the ID association result aggregation means 34 aggregates with which ID trajectory information in a trajectory link included in an ID association candidate is associated for all the ID association candidates generated in step S6 (step S7). The ID association result aggregation means 34 identifies trajectory information by a trajectory number. FIG. 22 is a flowchart specifically illustrating the processing in step S7.

In step S7, the ID association result aggregation means 34 creates an aggregation map for identifying a row by a trajectory number of each item of trajectory information acquired for a certain period of time and for identifying a column by ID of a moving body detected in a certain period of time (step S701). The aggregation map is a table in which each row is assigned with a trajectory number and each column is assigned with ID of a moving body, where a part corresponding to a crossing part of a row and a column is called cell. A value can be stored in a cell. The initial value of each cell is 0.

The ID association result aggregation means 34 determines whether a trajectory link candidate unselected in step S703 is present among the trajectory link candidates (step S702). When an unselected trajectory link candidate is present (Yes in step S702), the ID association result aggregation means 34 selects one trajectory link candidate unselected in step S702 from among the trajectory link candidates (step S703).

The ID association result aggregation means 34 then determines whether a trajectory link unselected in step S705 is present among the trajectory links included in the trajectory link candidate selected in step S703 (step S704). When a trajectory link unselected in step S705 is present in the trajectory link candidate (Yes in step S704), the ID association result aggregation means 34 selects an unselected trajectory link from the trajectory link candidate. Further, the ID association result aggregation means 34 specifies ID of a moving body associated with the trajectory link (trajectory link selected from the currently focused trajectory link candidate) by the ID association means 33 (step S705).

The ID association result aggregation means 34 then determines whether trajectory information unselected in step S707 is present in the trajectory information included in the trajectory link selected in step S705 (step S706). When trajectory information unselected in step S707 is present in the trajectory link (Yes in step S706), the ID association result aggregation means 34 selects unselected trajectory information from the trajectory link. Further, the ID association result aggregation means 34 adds 1 to the value of the cell defined by the trajectory number of the trajectory information and the ID of the moving body specified in step S705 in the aggregation map. That is, the ID association result aggregation means 34 adds 1 to the value of the cell at the crossing part of the row corresponding to the trajectory number and the column corresponding to the ID (step S707).

After step S707, the ID association result aggregation means 34 repeats the operations in and subsequent to step S706. When unselected trajectory information is not present in the trajectory link selected in step S705 (No in step S706), the ID association result aggregation means 34 repeats the operations in and subsequent to step S704.

When an unselected trajectory link is not present in the trajectory link candidate selected in step S703 (No in step S704), the ID association result aggregation means 34 repeats the operations in and subsequent to step S702.

When a trajectory link candidate unselected in step S703 is not present (No in step S702), the ID association result aggregation means 34 terminates the processing in step S7.

A value of each cell acquired at the end of step S7 may be a quantified trend of the number of times when trajectory information is associated with ID of a moving body.

After step S7, the ID association score calculation means 35 calculates an ID association score per ID for an individual trajectory number based on the result aggregated in step S7 (or the value of each cell in the aggregation map) (step S8). For example, the ID association score calculation means 35 may normalize a value of each cell such that a sum of the values of the cells amounts 1 per column indicated by an individual trajectory number in the aggregation map. That is, the ID association score calculation means 35 may divide the value of an individual cell in the column by the total sum of the values of the cells in the column per column indicated by an individual trajectory number. The consequently-acquired value of an individual cell is an ID association score for a pair of trajectory number and ID of the moving body corresponding to the cell. A trajectory number indicates trajectory information, and thus an ID association score of each ID is acquired for an individual item of trajectory information based on the result in step S8.

Information including trajectory information and a list of ID association scores and ID found per ID for the trajectory information includes information on a position coordinate of a moving body, detection time and ID of the moving body. Therefore, the information may be movement line information including an ID association score. The ID association score calculation means 35 generates the movement line information.

The scored ID candidate output means 36 outputs movement line information including an ID association score acquired by the processings up to step S8 to the movement line information analysis unit 4 (step S9).

The information output form from the scored ID candidate output means 36 to the movement line information analysis unit 4 in step S9 is not particularly limited. For example, the scored ID candidate output means 36 may output relevant information to the movement line information analysis unit 4 at each detection time on time basis. For example, the scored ID candidate output means 36 may output, to the movement line information analysis unit 4, detection time t1, a position coordinate of a moving body detected at time t1, a trajectory number assigned to the time and the position coordinate by the trajectory information input unit 1, and a list of ID association scores and ID per ID calculated for the trajectory number. This is applicable to other detection time.

For example, the scored ID candidate output means 36 may output relevant information to the movement line information analysis unit 4 per position coordinate with reference to a position coordinate of a moving body. For example, the scored ID candidate output means 36 may output, to the movement line information analysis unit 4, a position coordinate a, detection time at the position coordinate a, a trajectory number assigned to the time and the position coordinate by the trajectory information input unit 1, and a list of ID association scores and ID per ID calculated for the trajectory number. This is applicable to other position coordinate.

For example, the scored ID candidate output means 36 may output relevant information to the movement line information analysis unit 4 per trajectory number on a trajectory number basis. For example, the scored ID candidate output means 36 may output, to the movement line information analysis unit 4, trajectory information indicated by a trajectory number, and a list of ID association scores and ID per ID calculate for the trajectory number per trajectory number.

For example, the scored ID candidate output means 36 may output, to the movement line information analysis unit 4, only a trajectory number and a list of ID association scores and ID per ID calculated for the trajectory number. In this case, if the analysis needs a position coordinate, a detection time thereof, and ID information, the movement line information analysis unit 4 may directly acquire the information from the trajectory information input unit 1 or the ID information input unit 2.

The analysis form made by the movement line information analysis unit 4 by use of the information acquired in step S9 is not particularly limited.

According to the present exemplary embodiment, the trajectory link candidate generation means 31 generates trajectory links and trajectory link candidates. The ID association likelihood calculation means 32 then calculates an ID association likelihood per trajectory link/ID pair. The ID association means 33 associates a trajectory ink in a trajectory link candidate with likely ID per trajectory link candidate by use of an ID association likelihood. Therefore, even if missing detection or erroneous detection occurs for a position coordinate of a moving body in the trajectory information input unit 1, or missing detection or erroneous detection occurs for ID of a moving body in the ID information input unit 2, a plurality of trajectory link candidates in which a trajectory link is associated with likely ID can be generated. That is, a hypothesis indicating a true state cannot be included but a plurality of certainly likely hypotheses can be generated. The ID association result aggregation means 34 then aggregates with which ID trajectory information in a trajectory link is associated, and the ID association result aggregation means 34 scores a trend of with which ID trajectory information is associated based on the aggregation result. Therefore, how much an association between individual trajectory information and ID of an individual moving body is ambiguous can be quantified based on a trend of a set of certainly likely hypotheses.

A variant of the above exemplary embodiment will be described below. In the above exemplary embodiment, the value to be added to a cell in step S707 (see FIG. 22) is defined at 1. To the contrary, in the variant described below, the ID association result aggregation means 34 calculates a score indicating a likelihood of a trajectory link candidate per trajectory link candidate, and adds the value to a cell in the aggregation map according to the score. The processing in step S7 according to the variant described below is different from that according to the above exemplary embodiment. The processings other than step S7 are the same as those in the above exemplary embodiment, and thus a description thereof will be omitted.

In the variant described below, two methods are indicated for a method for calculating a score indicating a likelihood of a trajectory link candidate. The first score calculation method is to assume a score indicating a likelihood of a trajectory link candidate with reference to an ID association likelihood for a pair of trajectory link and ID acquired by associating a trajectory link included in a trajectory link candidate with ID by the ID association means 33 by use of a product of the ID association likelihoods per trajectory link included in the trajectory link candidate. With the score calculation method, an ID association likelihood is specified per trajectory link included in a trajectory link candidate, and a products of the ID association likelihoods is found per trajectory link candidate, thereby normalizing the product result of the ID association likelihoods per trajectory link candidate to be a total sum of 1.

The second method for calculating a score indicating a likelihood of a trajectory link candidate may employ the following method. With the second calculation method, for example, the trajectory information input unit 1 detects not only a position coordinate but also attribute information at a detection time of the position coordinate of a moving body, and the trajectory link candidate generation means 31 includes the attribute information of the moving body at each detection time in trajectory information. The attribute information is assumed to be a quantified value. For example, a color of the moving body can be quantified in a range of 0 to 255 for R, G and B. Such information capable of being quantified is employed as attribute information. Then, with the second calculation method, the ID association result aggregation means 34 calculates a variance of attribute information included in each item of trajectory information in a trajectory link per trajectory link included in a trajectory link candidate. Further, the ID association result aggregation means 34 also calculates a detection time length per trajectory link included in a trajectory link candidate. A detection time length of a trajectory link is a time between the detection time at the start point of the trajectory information with the earliest detection time of the start point among the trajectory information included in the trajectory link and the detection time at the end point of the trajectory information with the latest detection time of the end point among the trajectory information included in the trajectory link. The ID association result aggregation means 31 calculates an average value (denoted as $\sigma_{ave}$) of the variance values of the attribute information calculated for trajectory links included in a trajectory link candidate, and a sum (denoted as $T_{sum}$) of the detection time lengths per trajectory link candidate. Then, the ID association result aggregation means 34 normalizes $\sigma_{ave}$ per trajectory link candidate to be a total sum of 1. Similarly, the ID association result aggregation means 34 normalizes $T_{sum}$ per trajectory link candidate to be a total sum of 1. The ID association result aggregation means 34 calculates the following Equation (1) by use of normalized $\sigma_{ave}$ and normalized $T_{sum}$ per trajectory link candidate, and assumes the result as a score S indicating a likelihood of the trajectory link candidate.

$$S = \alpha \cdot (\text{normalized } \sigma_{ave}) + \beta \cdot (\text{normalized } T_{sum}) \quad \text{Equation (1)}$$

$\alpha$ and $\beta$ are the coefficients meeting $\alpha + \beta = 1$, and the values $\alpha$ and $\beta$ may be previously adjusted to acquire good movement line information.

Figure 23:
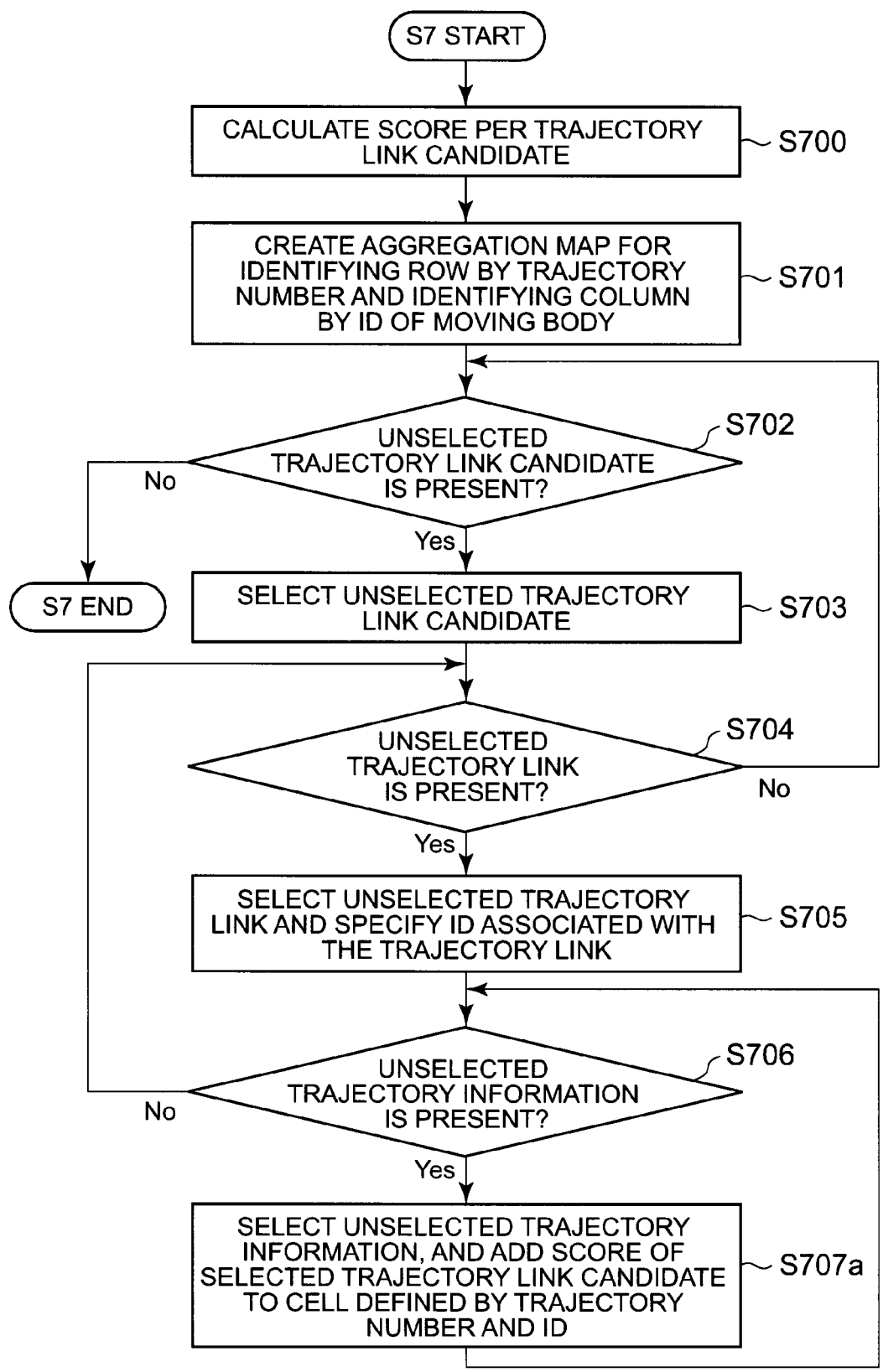
FIG. 23 It depicts a flowchart specifically illustrating the processing in step S7 according to a variant of the exemplary embodiment of the present invention.

FIG. 23 is a flowchart specifically illustrating the processing in step S7 (see FIG. 7) according to the variant of the above exemplary embodiment. The same processings as those in FIG. 22 are denoted with the same reference numerals as in FIG. 22. According to the present variant, the ID association result aggregation means 34 calculates a score indicating a likelihood of a trajectory link candidate per trajectory link candidate (step S700) before an aggregation map creation processing (step S701). A method for calculating a score indicating a likelihood of a trajectory link candidate may employ the first calculation method or second calculation method described above. A specific processing progress in the calculation methods will be described.

After step S700, the ID association result aggregation means 34 performs the processings in and subsequent to step S701. The processings in steps S701 to S706 are the same as in the above exemplary embodiment (see FIG. 22), and thus a description thereof will be omitted.

When determining that unselected trajectory information is present among the trajectory information included in the trajectory link selected in step S705 in step S706 (Yes in step S706), the ID association result aggregation means 34 selects unselected trajectory information from the trajectory link. Further, the ID association result aggregation means 34 adds a score of the trajectory link candidate selected in step S703 (score indicating a likelihood of the trajectory link candidate) to the value of the cell defined by the trajectory number of the trajectory information and the ID of the moving body specified in step S705 in the aggregation map (step S707*a*).

The processing of calculating a score indicating a likelihood of a trajectory link candidate (step S700) will be specifically described below.

Figure 24:
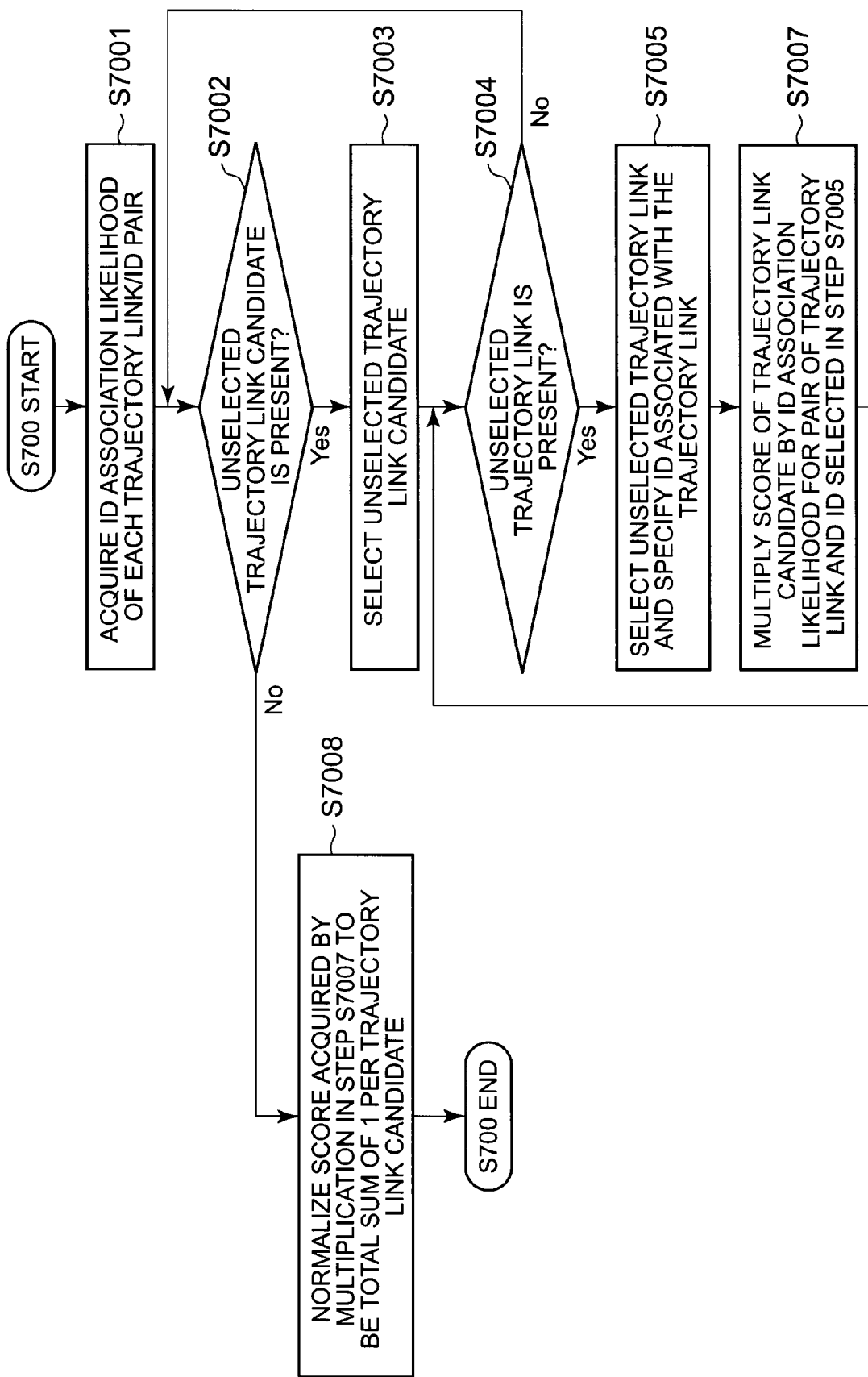
FIG. 24 It depicts a flowchart illustrating an exemplary processing progress of step S700.

A case in which the first calculation method is employed will be described first. FIG. 24 is a flowchart illustrating an exemplary processing progress in step S700 when the first calculation method is employed. In step S700, similar processings to steps S702 to S705 (see FIG. 22 and FIG. 23) previously described are performed. These processings are denoted with the reference numerals S7002 to S7005 in FIG. 24.

In step S700, the ID association result aggregation means 34 first acquires an ID association likelihood of each trajectory link/ID pair calculated by the ID association likelihood calculation means 32 (step S7001). After step S7001, the ID association result aggregation means 34 performs the processings in and subsequent to step S7002. The processings in step S7002 to S7005 are the same as steps S702 to S705 (see FIG. 22 and FIG. 23), and thus a description thereof will be omitted.

The ID association result aggregation means 34 selects a trajectory link and specifies ID associated with the trajectory link in step S7005. The processing is the same as step S705 described above. After step S7005, the ID association result aggregation means 34 multiplies a score of the trajectory link candidate selected in step S7003 (score indicating a likelihood of the trajectory link candidate) by an ID association likelihood for the pair of trajectory link selected in step S7005 and ID specified in step S7005 (step S7007).

With the first calculation method, the ID association result aggregation means 34 initializes a score of each trajectory link candidate (score indicating a likelihood of a trajectory link candidate) at "1" at the start of step S700. Therefore, when the processing first proceeds to step S7007 after a trajectory link candidate is selected in step S7003, the ID association result aggregation means 34 multiplies the initial value "1" of the score by the ID association likelihood.

After step S7007, the ID association result aggregation means 34 repeats the processings in and subsequent to step S7004. The steps S7004 to S7007 are repeated for the trajectory link candidate selected in step S7003 until an unselected trajectory link is not present so that the ID association result aggregation means 34 can acquire a multiplication result of the ID association likelihood per trajectory link included in the trajectory link candidate as a score.

When an unselected trajectory link is not present for the trajectory link candidate selected in step S7003 (No in step S7004), the ID association result aggregation means 34 repeats the processings in and subsequent to step S7002. The processings in and subsequent to step S7002 are repeated until an unselected trajectory link candidate is not present so that the ID association result aggregation means 34 can acquire a score per trajectory link candidate.

When an unselected trajectory link candidate is not present (No in step S7002), the ID association result aggregation means 34 normalizes the score acquired by the product by the ID association likelihood in step S7007 per trajectory link candidate to be a total sum of 1 for each score (step S70008). That is, the ID association result aggregation means 34 may divide the score of an individual trajectory link candidate by the total sum of scores of the trajectory link candidate. Consequently, the value acquired per trajectory link candidate is a score indicating a likelihood of the trajectory link candidate.

Step S700 ends with the end of step S7008. Thereafter, the ID association result aggregation means 34 may perform the processings in and subsequent to step S701 illustrated in FIG. 23.

With the first calculation method, the logarithmic value of an ID association likelihood may be employed instead of the ID association likelihood. In this case, the ID association result aggregation means 34 may calculate the logarithmic value of an ID association likelihood of each trajectory link/ID pair in step S7001. The ID association result aggregation means 34 may then add the logarithmic value of the ID association likelihood to the score of the selected trajectory link candidate in step S7007.

Figure 25:
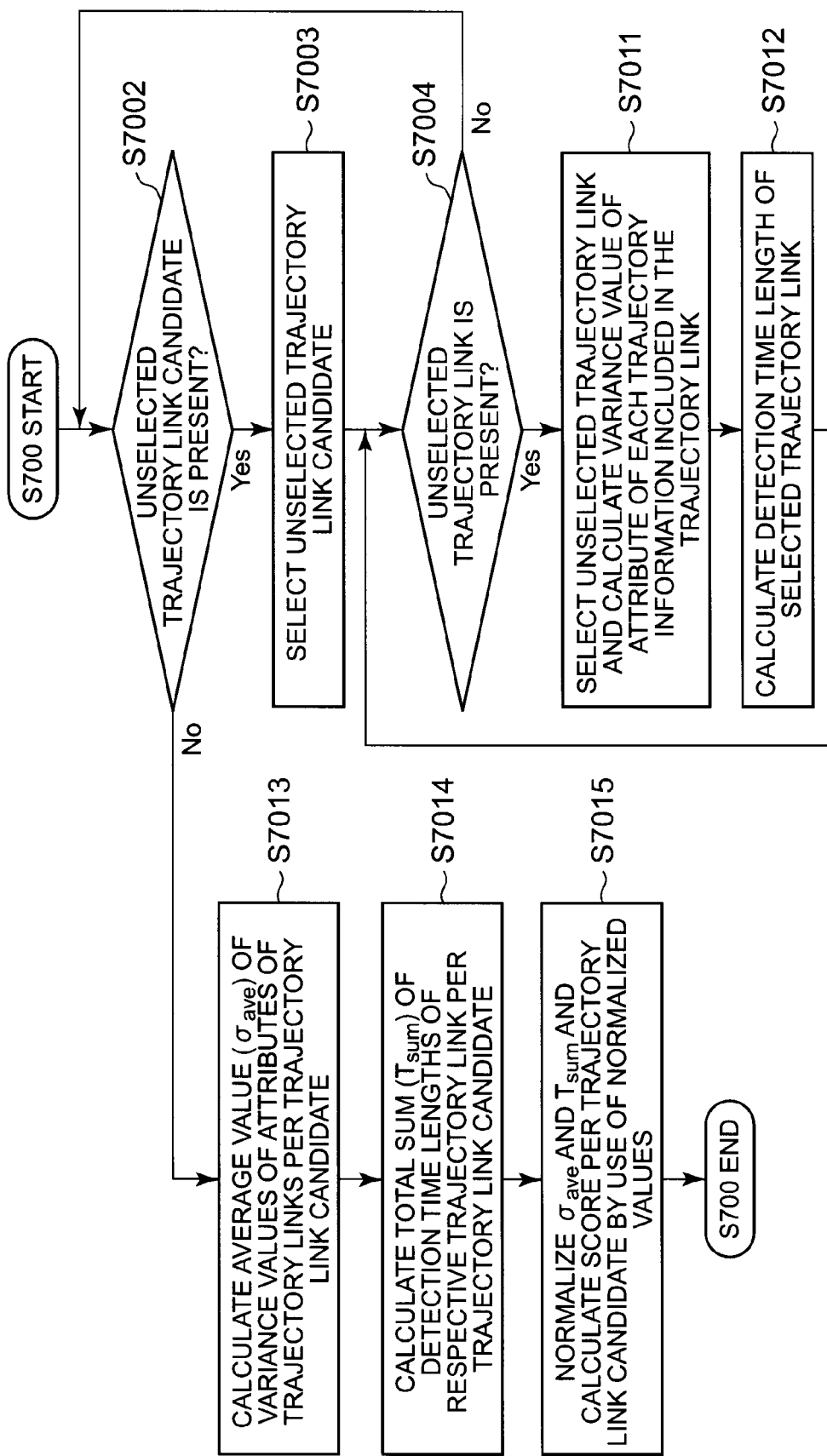
FIG. 25 It depicts a flowchart illustrating an exemplary processing progress of step S700.

A case in which the second calculation method is employed will be described below. FIG. 25 is a flowchart illustrating an exemplary processing progress in step S700 when the second calculation method is employed. Like when the first calculation method is employed, the processings similar to steps S702 to S704 described above (see FIG. 22 and FIG. 23) are performed in step S700. In FIG. 25, the processings are denoted with the reference numerals S7002 to S7004.

In step S700, the ID association result aggregation means 34 starts with with the processing step S7002. The processings in steps S7002 to S7004 are the same as steps S702 to S704 (see FIG. 22 and FIG. 23), and thus a description thereof will be omitted.

When determining that an unselected trajectory link is present in the selected trajectory link candidate in step S7004 (Yes in step S7004), the ID association result aggregation means 34 selects an unselected trajectory link from the trajectory link candidate. The ID association result aggregation means 34 then calculates a variance value of attribute information included in each item of trajectory information in the selected trajectory link (step S7011). When the second calculation method is employed, the attribute information is a quantified attribute value, and a variance value of the attribute information can be calculated. The ID association result aggregation means 34 may calculate a variance value of the attribute information detected at individual detection time with reference to each item of trajectory information in the selected trajectory link.

The ID association result aggregation means 34 then calculates a detection time length of the trajectory link selected in step S7011 (step S7012). The ID association result aggregation means 34 may calculate a detection time by subtracting the detection time at the start point of the trajectory information with the earliest detection time of the start point among the trajectory information included in the trajectory link from the detection time at the end point of the trajectory information with the latest detection time of the end point among the trajectory information included in the trajectory link.

After step S7012, the ID association result aggregation means 34 repeats the processings in and subsequent to step S7004. When an unselected trajectory link is not present for the trajectory link candidate selected in step S7003 (No in step S7004), the ID association result aggregation means 34 repeats the processings in and subsequent to step S7002. The processings in and subsequent to step S7002 are repeated until an unselected trajectory link candidate is not present so that a variance value of attribute information and a detection time length for each trajectory link in the trajectory link candidate can be acquired per trajectory link candidate.

When an unselected trajectory link candidate is not present (No in step S7002), the ID association result aggregation means 34 calculates an average value of the variance values of the attribute information for the trajectory links in the trajectory link candidate per trajectory link candidate (step S7013). An average value of the variance values found for one trajectory link candidate is denoted as $\sigma_{ave}$.

Subsequently, the ID association result aggregation means 34 calculates a total sum of detection time lengths of the respective trajectory links in the trajectory link candidate per trajectory link candidate (step S7014). A total sum of detection time lengths found for one trajectory link candidate is denoted as $T_{sum}$.

The examples of steps S7013 and S7014 will be described. The description will be made herein by use of two trajectory link candidates (denoted as U and V) for simplified description.

It is assumed that the trajectory link candidate U includes two trajectory links $U_1$ and $U_2$. It is then assumed that a variance value and a detection time length of the attributes calculated for the trajectory link $U_1$ are $\sigma_{U1}$ and $T_{U1}$, respectively, and a variance value and a detection time length of the attributes calculated for the trajectory link $U_2$ is $\sigma_{U2}$ and $T_{U2}$, respectively.

It is assumed that the trajectory link candidate V includes three trajectory links $V_1$, $V_2$ and $V_3$. A variance value and a detection time length of the attributes calculated for the trajectory link $V_1$ are assumed as $\sigma_{V1}$ and $T_{V1}$, respectively. A variance value and a detection time length of the attributes calculated for the trajectory link $V_2$ are assumed as $\sigma_{V2}$ and $T_{V2}$, respectively. A variance value and a detection time length of the attributes calculated for the trajectory link $V_3$ are assumed as $\sigma_{V3}$ and $T_{V3}$, respectively.

In the present example, the ID association result aggregation means 34 may calculate an average value of $\sigma_{U1}$ and $\sigma_{U2}$ as $\sigma_{ave}$ of the trajectory link candidate U (average value of the variance values of the attribute information) in step S7013. The ID association result aggregation means 34 may calculate an average value of $\sigma_{V1}$, $\sigma_{V2}$ and $\sigma_{V3}$ as $\sigma_{ave}$ of the trajectory link candidate V.

The ID association result aggregation means 34 may calculate a sum of $T_{U1}$ and $T_{U2}$ as $T_{sum}$ (total sum of the detection time lengths) of the trajectory link candidate U in step S7014. The ID association result aggregation means 34 may calculate a sum of $T_{V1}$, $T_{V2}$ and $T_{V3}$ as $T_{sum}$ of the trajectory link candidate V.

After step S7014, the ID association result aggregation means 34 normalizes $\sigma_{ave}$ (average value of the variance values of the attribute information) found per trajectory link candidate, and also normalizes $T_{sum}$ (total sum of the detection time lengths) found per trajectory link candidate. The ID association result aggregation means 34 may divide $\sigma_{ave}$ of an individual trajectory link candidate by the total sum of $\sigma_{ave}$ of the trajectory link candidate. The ID association result aggregation means 34 may divide $T_{sum}$ of an individual trajectory link candidate by the total sum $T_{sum}$ of the trajectory link candidate. The ID association result aggregation means 34 then calculates the above Equation (1) by use normalized $\sigma_{ave}$ and normalized $T_{sum}$ per trajectory link candidate, and assumes its result as a score S indicating a likelihood of the trajectory link candidate (step S7015).

Step S700 ends with the end of step S7015. Thereafter, the ID association result aggregation means 34 may perform the processings in and subsequent to step S701 indicated in FIG. 23.

According to the variant of the exemplary embodiment described above, an ID association score can be calculated based on a score indicating a likelihood of a trajectory link candidate found for each trajectory link candidate.

A score indicating a likelihood of a trajectory link candidate may be calculated by use of a normalized score acquired in step S7008 in the first calculation method as well as normalized $\sigma_{ave}$ and normalized $T_{sum}$ acquired in step S7015 in the second calculation method. In this case, the ID association result aggregation means 34 may calculate the following Equation (2) per trajectory link candidate, and may assume its result as a score S indicating a likelihood of the trajectory link candidate.

$$S = \alpha \cdot (\text{normalized } \sigma_{ave}) + \beta \cdot (\text{normalized } T_{sum}) + \gamma \cdot (\text{normalized sore}) \quad \text{Equation (2)}$$

In Equation (2), the normalized score is acquired in step S7008 in the first calculation method. In Equation (2), $\alpha$, $\beta$ and $\gamma$ are the coefficients meeting $\alpha+\beta+\gamma=1$. Then, the values of $\alpha$, $\beta$ and $\gamma$ may be previously adjusted in order to acquire good movement line information.

Figure 26:
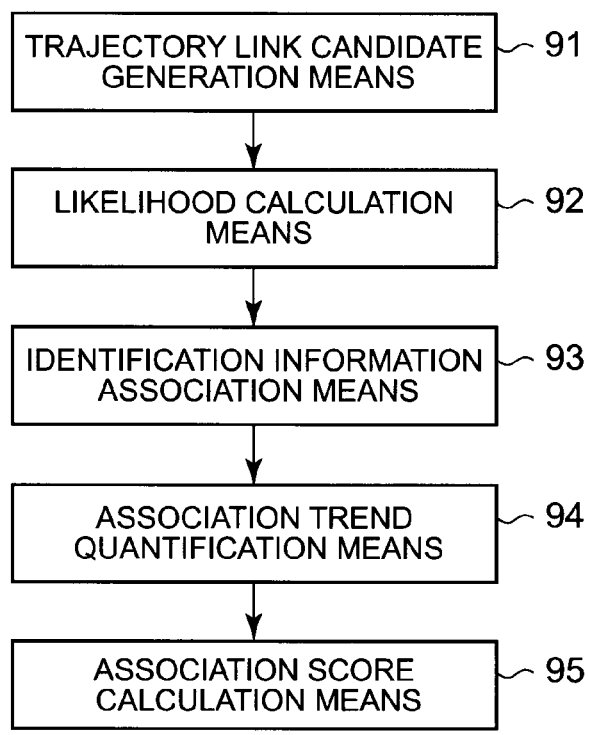
FIG. 26 It depicts a block diagram illustrating an exemplary minimum structure of a movement line information generation system according to the present invention.

A minimum structure of the present invention will be described below. FIG. 26 is a block diagram illustrating an exemplary minimum structure of movement line information generation system according to the present invention. The movement line information generation system according to the present invention includes a trajectory link candidate generation means 91, a likelihood calculation means 92, an identification information association means 93, an association trend quantification means 94, and an association score calculation means 95.

The trajectory link candidate generation means 91 (the trajectory link candidate generation means 31, for example) generates trajectory links which are a set of trajectory information capable of being assumed to indicate a trajectory of one moving body, and a trajectory link candidate which is a set of trajectory links including all of trajectory information without omission and overlap by use of trajectory information which indicates a trajectory of a moving body or a segment of a trajectory of a moving body due to interrupted tracking and which includes trajectory identification information (such as trajectory number) for identifying trajectory information, and a list of position information and detection times of the position information of a moving body detected while the moving body is being tracked.

The likelihood calculation means 92 (the ID association likelihood calculation means 32, for example) calculates a likelihood (ID association likelihood, for example) concerning the trajectory link indicates the trajectory of the moving body which is identified by the moving body identification Information, per trajectory link/identification information pair (trajectory link/ID pair, for example) which is a combination of trajectory link and moving body identification information (moving body ID) detected in a tracking region.

The identification information association means 93 (the ID association means 33, for example) associates an individual trajectory link included in a trajectory link candidate with likely moving body identification information per trajectory link candidate based on a likelihood calculated per trajectory link/identification information pair.

The association trend quantification means 94 (the ID association result aggregation means 34, for example) quantifies a trend of the number of times when trajectory information is associated with moving body identification information per individual moving body identification information for individual trajectory information based on an association result between each trajectory link included in an individual trajectory link candidate and the moving body identification information.

The association score calculation means 95 (the ID association score calculation means 35, for example) calculates an association score (ID association score, for example) indicating how much an association between a trajectory indicated by trajectory information and a trajectory of a moving body identified by moving body identification information is ambiguous for each item of moving body identification information per trajectory information based on a value indicating a trend of the number of times when the trajectory information is associated with the moving body identification information (a value of each cell in an aggregation map at the end of step S7, for example).

The association trend quantification means 94 refers to an association result between a trajectory link and moving body identification information acquired per trajectory link candidate by the identification information association means 93, and when an association pair of trajectory link and moving body identification information is established, may add 1 to each pair of individual trajectory information and moving body identification information in a trajectory link.

The association trend quantification means 94 calculates a score indicating a likelihood of a trajectory link candidate per trajectory link candidate, refers to an association result between a trajectory link and moving body identification information acquired per trajectory link candidate by the identification information association means 93, and when an association pair of trajectory link and moving body identification information is established, may add a score indicating a likelihood of the trajectory link candidate including the trajectory link for each pair of individual trajectory information and moving body identification information in the trajectory link.

The association trend quantification means 94 multiplies a likelihood for a pair of trajectory link included in the trajectory link candidate and moving body identification information associated with the trajectory link by the identification information association means 93 by each trajectory link included in the trajectory link candidate, thereby calculating a score indicating a likelihood of the trajectory link candidate.

The trajectory link candidate generation means 91 generates trajectory links and trajectory link candidates by use of trajectory information including attribute information of a moving body, and the association trend quantification means 94 may calculate a score indicating a likelihood of a trajectory link candidate based on each item of attribute information of a moving body included in a trajectory link included in a trajectory link candidate, and a length between the first detection time and the last detection time of trajectory information included in the trajectory link.

The association score calculation means 95 may calculate ac association score such that a total sum of association scores for each item of moving body identification information is 1 per trajectory information.

The trajectory link candidate generation means 91 may prohibit a set of trajectory information meeting a predefined condition from being assumed as a trajectory link.

The present application claims the priority based on Japanese Patent Application No. 2012-043641 filed on Feb. 29, 2012, the disclosure of which is all incorporated herein by reference.

The present invention has been described above with reference to the exemplary embodiment, but the present invention is not limited to the above exemplary embodiment. The structure and details of the present invention may be variously changed within the scope understandable by those skilled in the art.

INDUSTRIAL APPLICABILITY

The present invention is suitably applied to a movement line information generation system for finding an association between a trajectory and ID of a moving body.

For example, it is applicable to a system for determining whether each person is present in an area permitted depending on his/her security authority by associating a position of the person working at an office or factory with an employee number specific to the person and detecting his/her movement line, and issuing an alert when the person is outside the permitted area.

It is further applicable to a system for detecting a movement line by associating a position of a shopper shopping in a shopping mall and a member number specific to the shopper with ID association scores, and visualizing how much a movement line of the shopper is probable. Furthermore, it is applicable to a system for visualizing a main movement line is which movement lines of a plurality of persons whose movement paths are similar to each other are put together for marketing.

It is applicable to a system for accumulating ID associated with a trajectory detected in each selling floor which is an arbitrarily divided region, and ID association scores of the ID, thereby visualizing a distribution of persons per selling floor. Further, it is applicable to a system for acquiring attribute information such as age, sex and preference of a person based on ID, and accumulating ID associated with a trajectory detected in each selling floor and ID association scores of the ID, thereby visualizing at which rate what type of persons is present in each selling floor.

REFERENCE SIGNS LIST

1 Trajectory information input unit
2 ID information input unit
3 Movement line information generation unit
4 Movement line information analysis unit
31 Trajectory link candidate generation means
32 ID association likelihood calculation means
33 ID association means
34 ID association result aggregation means
35 ID association score calculation means
36 Snored ID candidate output means

The invention claimed is:

1. A trajectory display apparatus comprising:
at least one memory configured to store instructions; and
at least one processor configured to execute the instructions to perform:
controlling a camera to capture images of moving bodies in a tracking region;
inputting trajectories of the moving bodies in the tracking region of the images;
generating a score for each moving body trajectory included in the tracking region of the images, each score indicating a likelihood that the respective moving body trajectories included in the tracking region of the images correspond to identification information of at least one object;
determining an area of the tracking region of the images having a high density of the moving bodies, the high density of the moving bodies in the area being of a predetermined value or higher;
associating, based on the scores, a set of the moving bodies in the tracking region of the images and a set of the identification information; and
controlling a display to display, for the area having the high density of the moving bodies, trajectories of the set of the of the moving bodies in the tracking region of the images, present in the area having the high density of the moving bodies, and pieces of information of the set of the identification information which may correspond thereto, in association with the scores, on a map.

2. The trajectory display apparatus according to claim 1, wherein
the at least one processor is configured to execute the instructions to perform:
controlling the display to display the scores in association with the set of the moving bodies in the tracking region of the images and the set of the identification information.

3. The trajectory display apparatus according to claim 2, wherein
the at least one processor is configured to execute the instructions to perform:
associating the set of the moving bodies in the tracking region of the images with the set of the identification information on the basis of a sum of the scores corresponding to the set of the identification information; and
controlling the display to display a result of the association between the set of the moving bodies in the tracking region of the images and the set of the identification information.

4. A trajectory display method comprising:
capturing, by a camera images of moving bodies in a tracking region,
inputting trajectories of the moving bodies in the tracking region of the images;
generating a score for each moving body trajectory included in the tracking region of the image, each score indicating a likelihood that the respective moving body trajectories included in the tracking region of the images correspond to identification information of at least one object; and
determining an area of the tracking region of the images having a high density of the moving bodies, the high density of the moving bodies in the area being of a predetermined value or higher;
associating, based on the scores, a set of the moving bodies in the tracking region of the images and a set of the identification information; and
controlling a display to display, for the area having the high density of the moving bodies, trajectories of the set of the moving bodies in the tracking region of the images, present in the area having the high density of moving bodies, and pieces of information of the set of the identification information which may correspond thereto, in association with the scores, on a map.

5. The trajectory display method according to claim 4, comprising:
controlling the display to display the scores in association with the set of the moving bodies in the tracking region of the images and the set of the identification information.

6. The trajectory display method according to claim 5, comprising:
associating the set of the moving bodies in the tracking region of the images with the set of the identification information on the basis of a sum of the scores corresponding to the set of the identification information; and
controlling the display to display a result of the association between the set of the moving bodies in the tracking region of the images and the set of the identification information.

7. The trajectory display apparatus according to claim 1, wherein the tracking region is disposed in a building.

8. The trajectory display apparatus according to claim 1, wherein the moving bodies are persons.

9. The trajectory display method according to claim 4, wherein the tracking region is disposed in a building.

10. The trajectory display method according to claim 4, wherein the moving bodies are persons.

11. A non-transitory recording medium storing instructions, the instructions causing a computer to perform:
controlling a camera to capture images of moving bodies in a tracking region;
inputting trajectories of the moving bodies in the tracking region of the images;
generating a score for each moving body trajectory included in the tracking region of the image, each score indicating a likelihood that the respective moving body trajectories included in the tracking region of the images correspond to identification information of at least one object; and determining an area of the tracking region of the images having a high density of the moving bodies, the high density of the moving bodies in the area being of a predetermined value or higher;

associating, based on the scores, a set of the moving bodies in the tracking region of the images and a set of the identification information; and controlling a display to display, for the area having the high density of the moving bodies, trajectories of the set of the moving bodies in the tracking region of the images, present in the area having the high density of the moving bodies, and pieces of information of the set of the identification information which may correspond thereto, in association with the scores, on a map.

12. The non-transitory recording medium according to claim 11, wherein the instructions causes the computer to perform:

controlling the display to display the scores in association with the set of the moving bodies in the tracking region of the images and the set of the identification information.

13. The non-transitory recording medium according to claim 12, wherein the instructions causes the computer to perform:

associating the set of the moving bodies in the tracking region of the images with the set of the identification information on the basis of a sum of the scores corresponding to the set of the identification information; and controlling the display to display a result of the association between the set of the moving bodies in the tracking region of the images and the set of identification information.

14. The non-transitory recording medium according to claim 11, wherein the tracking region is disposed in a building.

15. The non-transitory recording medium according to claim 11, wherein the moving bodies are persons.

* * * * *